United States Patent
Satoh et al.

(10) Patent No.: US 9,726,958 B2
(45) Date of Patent: Aug. 8, 2017

(54) DISPLAY PANEL AND DISPLAY DEVICE INCLUDING HYDROPHOBIC AND HYDROPHILIC TREATMENT OF SUBSTRATES

(71) Applicant: Sharp Kabushiki Kaisha, Osaka-shi, Osaka (JP)

(72) Inventors: Eiji Satoh, Osaka (JP); Kohzoh Nakamura, Osaka (JP); Hisashi Watanabe, Osaka (JP); Takahiro Nakahara, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 430 days.

(21) Appl. No.: 14/380,765

(22) PCT Filed: Feb. 26, 2013

(86) PCT No.: PCT/JP2013/054892
§ 371 (c)(1),
(2) Date: Aug. 25, 2014

(87) PCT Pub. No.: WO2013/129373
PCT Pub. Date: Sep. 6, 2013

(65) Prior Publication Data
US 2015/0015935 A1     Jan. 15, 2015

(30) Foreign Application Priority Data
Feb. 28, 2012 (JP) .................... 2012-042508

(51) Int. Cl.
G02B 26/00 (2006.01)
G02F 1/167 (2006.01)
(Continued)

(52) U.S. Cl.
CPC ........... *G02F 1/167* (2013.01); *G02B 26/023* (2013.01); *G02B 26/026* (2013.01); *G02F 1/13394* (2013.01); *G02F 1/19* (2013.01)

(58) Field of Classification Search
CPC ............. G02F 1/167; G02F 2001/1678; G02F 2001/1676; G02F 2001/1672; G02B 26/00
See application file for complete search history.

(56) References Cited

U.S. PATENT DOCUMENTS

2008/0037105 A1   2/2008   Van Bommel et al.
2008/0291526 A1*   11/2008   Lin .................... G02F 1/167
                                                                     359/296

(Continued)

FOREIGN PATENT DOCUMENTS

JP    2008-503788 A    2/2008
WO   2006/000996 A1   1/2006

OTHER PUBLICATIONS

Official Communication issued in International Patent Application No. PCT/JP2013/054892, mailed on Apr. 2, 2013.

*Primary Examiner* — Bumsuk Won
*Assistant Examiner* — Tamara Y Washington
(74) *Attorney, Agent, or Firm* — Keating & Bennett, LLP

(57) ABSTRACT

The present invention provides a display panel and a display device which can increase light use efficiency with a simple configuration. An optical modulation layer 30 provided between substrates 10 and 20 contains a polar solvent 31a, a nonpolar solvent 31b, and hydrophilic shape-anisotropic members 32, the hydrophilic substrate 20 makes contact with the polar solvent 31a, the hydrophobic substrate 10 makes contact with the nonpolar solvent 31b, a projected area of the shape-anisotropic members 32 onto the substrates (Continued)

10 and 20 is changed by adjusting a magnitude of a voltage to be applied to the optical modulation layer 30.

20 Claims, 20 Drawing Sheets

(51) Int. Cl.
    *G02F 1/19*           (2006.01)
    *G02B 26/02*         (2006.01)
    *G02F 1/1339*      (2006.01)

(56) References Cited

U.S. PATENT DOCUMENTS

| | | | | |
|---|---|---|---|---|
| 2011/0149376 A1* | 6/2011 | Mabeck | ............... | G02F 1/167 359/296 |
| 2011/0242146 A1* | 10/2011 | Uchida | ............ | G02B 6/0041 345/690 |

\* cited by examiner (a)

(b)

DISPLAY PANEL AND DISPLAY DEVICE INCLUDING HYDROPHOBIC AND HYDROPHILIC TREATMENT OF SUBSTRATES

TECHNICAL FIELD

The present invention relates to a display panel and a display device.

BACKGROUND ART

A conventional liquid crystal display panel mainly includes a pair of glass substrates, a liquid crystal layer provided between the glass substrates, electrodes provided on the glass substrates, and polarizing plates attached to the respective glass substrates. On such a liquid crystal display panel, an image is recognized by contrasts which appear on a screen by light that has been emitted by a backlight and has then passed through the polarizing plates and the liquid crystal layer. According to the configuration, most of the light emitted by the backlight is lost by being absorbed and reflected before reaching a display screen, and this causes a decrease in light use efficiency. In particular, loss of light due to the polarizing plates significantly influences the decrease in light use efficiency.

Patent Literature 1 discloses an optical device (i) which includes a pair of electrodes, a polar solvent and a nonpolar solvent, and flakes each of which has a hydrophilic layer and a hydrophobic layer and (ii) in which a longitudinal orientation and a transverse orientation of the flakes are switched by changing whether or not to apply a voltage. Specifically, in a case where no voltage is applied to an electrode 52, flakes each of which has a hydrophilic layer 41 and a hydrophobic layer 42 are aligned in parallel with a substrate 51 (i.e., the transverse orientation) at an interface between a polar solvent 31 and a nonpolar solvent 32 so as to reflect light, etc. (see (a) of FIG. 20). On the other hand, in a case where a voltage is applied to the electrode 52, the flakes are aligned perpendicular to the substrate 51 (i.e., the longitudinal orientation) so as to allow light to pass through (see (b) of FIG. 20). According to the configuration, it is possible to omit polarizing plates unlike the liquid crystal display panel, and this makes it possible to increase light use efficiency.

CITATION LIST

Patent Literature

[Patent Literature 1] Japanese Translation of PCT International Application Tokuhyo No. 2008-503788 (Publication Date: Feb. 7, 2008)

SUMMARY OF INVENTION

Technical Problem

However, according to the optical device of Patent Literature 1, each of the flakes needs to include the hydrophilic layer and the hydrophobic layer, and it is extremely difficult to carry out such treatment on fine flakes.

The present invention is accomplished in view of the problem, and its object is to provide a display panel and a display device which can increase light use efficiency with a simple configuration.

Solution to Problem

In order to attain the object, a display panel of the present invention includes:

a first substrate and a second substrate which are arranged to face each other, the first substrate being provided on a rear surface side and the second substrate being provided on a display surface side; and an optical modulation layer for controlling a transmittance of incoming light, the optical modulation layer being provided between the first substrate and the second substrate and containing a plurality of shape-anisotropic members, the optical modulation layer containing a polar solvent, a nonpolar solvent, and the plurality of shape-anisotropic members having a hydrophilic property or a hydrophobic property, one of the first substrate and the second substrate having a hydrophilic property and making contact with the polar solvent, the other one of the first substrate and the second substrate having a hydrophobic property and making contact with the nonpolar solvent, and a projected area of the plurality of shape-anisotropic members onto the first substrate and the second substrate being changed by adjusting a magnitude of a voltage to be applied to the optical modulation layer.

According to the configuration, in a case where the plurality of shape-anisotropic members have the hydrophilic property, the plurality of shape-anisotropic members can be oriented (i.e., transverse orientation) in the polar solvent while no voltage is applied to the optical modulation layer. Meanwhile, in a case where the plurality of shape-anisotropic members have the hydrophobic property, the plurality of shape-anisotropic members can be oriented (i.e., transverse orientation) in the nonpolar solvent while no voltage is applied to the optical modulation layer. Moreover, by applying a voltage to the optical modulation layer, it is possible to change the projected area of the plurality of shape-anisotropic members onto the first and second substrates.

As such, according to the configuration in which the plurality of shape-anisotropic members provided between the hydrophilic substrate and the hydrophobic substrate have the hydrophilic or hydrophobic property, it is possible to cause the plurality of shape-anisotropic members (i) to be contained in the polar solvent or the nonpolar solvent while no voltage is applied and (ii) to allow light to pass through while a voltage is applied. Therefore, it is possible to provide the display panel which has the simple configuration and achieves high light use efficiency.

According to the display panel, it is possible that:

in a case where the plurality of shape-anisotropic members have the hydrophilic property and are oriented so that major axes of the respective plurality of shape-anisotropic members are aligned in parallel with the first substrate and the second substrate, the plurality of shape-anisotropic members are contained in the polar solvent; and in a case where the plurality of shape-anisotropic members have the hydrophobic property and are oriented so that the major axes of the respective plurality of shape-anisotropic members are aligned in parallel with the first substrate and the second substrate, the plurality of shape-anisotropic members are contained in the nonpolar solvent.

This allows the plurality of shape-anisotropic members in the transverse orientation to be stabilized in a location contained in the polar solvent or the nonpolar solvent.

According to the display panel, it is possible that:

in a case where the plurality of shape-anisotropic members have the hydrophilic property, a layer thickness of the polar solvent is smaller than a layer thickness of the nonpolar solvent; and in a case where the plurality of shape-anisotropic members have the hydrophobic property, the layer thickness of the nonpolar solvent is smaller than the layer thickness of the polar solvent.

According to the display panel, it is possible that:

in a case where the plurality of shape-anisotropic members have the hydrophilic property, a layer thickness of the polar solvent is (i) smaller than a layer thickness of the nonpolar solvent and (ii) smaller than a major axis length of each of the plurality of shape-anisotropic members;

in a case where the plurality of shape-anisotropic members have the hydrophobic property, the layer thickness of the nonpolar solvent is (i) smaller than the layer thickness of the polar solvent and (ii) smaller than the major axis length of each of the plurality of shape-anisotropic members.

This allows the plurality of shape-anisotropic members to be rotated or transformed by interfacial tension that is generated between each of the plurality of shape-anisotropic members and the polar solvent or the nonpolar solvent.

According to the display panel, it is possible that the optical modulation layer allows light to pass through while a voltage is applied to the optical modulation layer, and the optical modulation layer blocks light while a voltage applied to the optical modulation layer is zero.

According to the display panel, it is possible that, while the voltage is applied to the optical modulation layer, the plurality of shape-anisotropic members are oriented so that the major axes are aligned perpendicular to the first substrate and the second substrate, and while the voltage applied to the optical modulation layer is zero, the plurality of shape-anisotropic members are oriented so that the major axes are aligned in parallel with the first substrate and the second substrate.

According to the display panel, it is preferable that the plurality of shape-anisotropic members have chargeability.

This makes it possible to utilize (i) force for causing the transverse orientation by interfacial tension and (ii) the electrophoretic force, and this allows an increase in response speed of the plurality of shape-anisotropic members.

According to the display panel, it is possible that the projected area is changed by rotating the plurality of shape-anisotropic members in accordance with the magnitude of the voltage to be applied to the optical modulation layer.

According to the display panel, it is possible that the projected area is changed by changing shapes of the respective plurality of shape-anisotropic members in accordance with the magnitude of the voltage to be applied to the optical modulation layer.

According to the display panel, it is possible that each of the plurality of shape-anisotropic members is partially fixed to the first substrate or the second substrate.

According to the configuration, it is possible to fix a part of each of the plurality of shape-anisotropic members to the first substrate or the second substrate.

According to the display panel, it is possible that:

in a case where the plurality of shape-anisotropic members have the hydrophilic property, a rib is formed on hydrophilic one of the first substrate and the second substrate;

in a case where the plurality of shape-anisotropic members have the hydrophobic property, a rib is formed on hydrophobic one of the first substrate and the second substrate.

This makes it possible to prevent a bias in flake density which is caused by the gravity, aggregation by voltage application, and the like.

According to the display panel, it is preferable that the rib has a lattice shape or an island shape.

According to the display panel, it is preferable that the rib has a height which is substantially identical with a thickness of the optical modulation layer.

This makes it possible to cause the rib to serve as a spacer for securing a distance between the first substrate and the second substrate.

According to the display panel, it is preferable that a height of the rib is 5 µm or lower.

This makes it possible to set a width of the rib to extremely small and it is therefore possible to reduce an area in which the flakes do not exit.

According to the display panel, it is preferable that each of the plurality of shape-anisotropic members is made of metal, a semiconductor, a dielectric substance, a dielectric multilayer film, or a cholesteric resin.

According to the display panel, it is possible that the plurality of shape-anisotropic members are made of metal and reflect incoming light.

This makes it possible to carry out reflection display.

According to the display panel, the plurality of shape-anisotropic members can be colored.

According to the display panel, it is possible that the optical modulation layer serves as a color filter; and the plurality of shape-anisotropic members are made of a transparent resin and include at least a red-colored shape-anisotropic member, a green-colored shape-anisotropic member, and a blue-colored shape-anisotropic member.

This makes it possible to carry out color display.

According to the display panel, it is preferable that each of the plurality of shape-anisotropic members has a flake shape, a columnar shape, or an ellipsoidal shape.

According to the display panel, it is possible that each of the plurality of shape-anisotropic members has a flake shape with a convexo-concave surface.

According to the display panel, it is possible that a thickness of the optical modulation layer is set to be (i) smaller than the major axis length of each of the plurality of shape-anisotropic members and (ii) a thickness with which, when the plurality of shape-anisotropic members are obliquely oriented with respect to the first substrate and the second substrate at a maximum angle, light reflected by the plurality of shape-anisotropic members is not directly emitted to the display surface side.

This makes it possible to reduce the thickness of the optical modulation layer, and it is accordingly possible to provide a thinner display panel.

According to the display panel, a colored layer can be provided on the first substrate.

In order to attain the object, a display device of the present invention includes:

the above described display panel and a backlight provided on a first substrate side.

According to the configuration, the light transmittance can be changed by adjusting the magnitude of voltage to be applied to the optical modulation layer. Moreover, as compared with a liquid crystal display device, it is possible to omit a polarizing plate of a liquid crystal display panel, and it is therefore possible to increase light use efficiency. Therefore, it is possible to provide the display device which achieves high light use efficiency with the simple configuration.

According to the display device, it is possible that:

the display device has (i) a reflection display mode for carrying out display by reflecting incoming outside light and (ii) a transmissive display mode for carrying out display by allowing light, emitted by the backlight, to pass through; and display is carried out while switching between the reflection display mode and the transmissive display mode.

This makes it possible to provide a so-called transflective display device.

According to the display device, it is possible that:

in the reflection display mode, display is carried out by utilizing outside light which has entered and is then reflected by the plurality of shape-anisotropic members; and in the transmissive display mode, display is carried out by utilizing light which has been emitted by the backlight and then passes through the optical modulation layer.

Advantageous Effects of Invention

As above described, the display panel and the display device of the present invention have the configuration in which the optical modulation layer contains the polar solvent, the nonpolar solvent, and the plurality of shape-anisotropic members having a hydrophilic property or a hydrophobic property, one of the first substrate and the second substrate has the hydrophilic property and makes contact with the polar solvent, the other one of the first substrate and the second substrate has the hydrophobic property and makes contact with the nonpolar solvent, and the projected area of the plurality of shape-anisotropic members onto the first substrate and the second substrate is changed by adjusting the magnitude of the voltage to be applied to the optical modulation layer. This makes it possible to provide the display panel and the display device which can increase light use efficiency with the simple configuration.

DESCRIPTION OF EMBODIMENTS

Embodiment 1

The following description will discuss a display device in accordance with Embodiment 1 of the present invention, with reference to the drawings.

Figure 1:
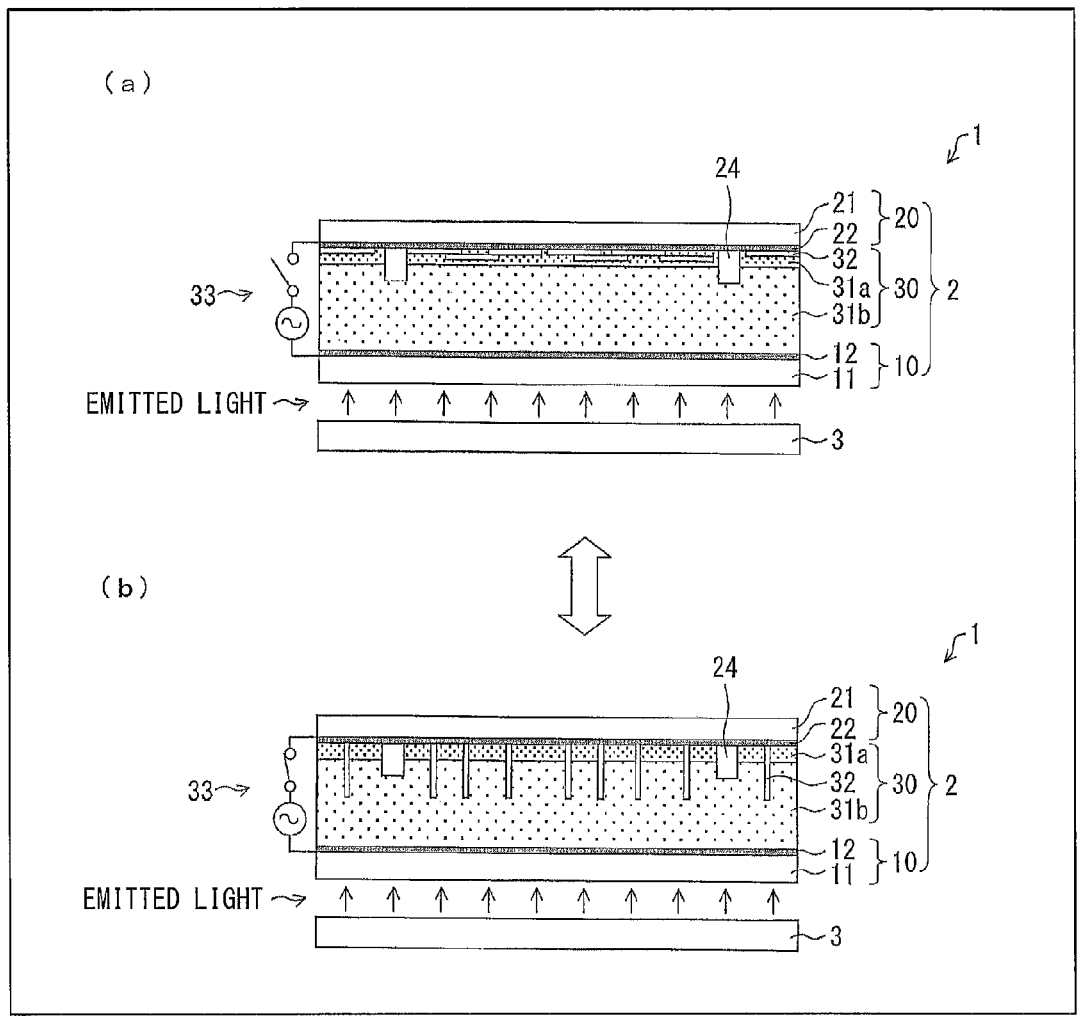
FIG. 1 is a cross-sectional view schematically illustrating, in (a) and (b), a configuration of a display device in accordance with Embodiment 1.

FIG. 1 is a cross-sectional view schematically illustrating, in (a) and (b), a configuration of a display device 1 in accordance with Embodiment 1. The display device 1 includes a display panel 2, a backlight 3 for irradiating the display panel 2 with light, and a driving circuit (not illustrated). The display device 1 is a transmissive display device which carries out display by allowing light, which has been emitted by the backlight 3, to pass through the display panel 2.

Note that the backlight 3 has a conventional configuration, and the configuration of the backlight 3 is not described in this specification. The backlight 3 can be, for example, an edge light surface light source device or a direct surface light source device. As a light source of the backlight 3, a fluorescent tube, an LED, or the like can be used as appropriate.

The display panel 2 includes (i) substrates 10 and 20 which are arranged to face each other and (ii) an optical modulation layer 30 which is provided between the substrates 10 and 20. The substrate 10 (first substrate) is provided on a backlight 3 side (rear surface side), and the substrate 20 (second substrate) is provided on a display surface side (viewer side). The display panel 2 has a plurality of pixels which are arranged in a matrix manner.

The substrates 10 and 20 include, for example, insulating substrates 11 and 21, respectively, which are transparent glass substrates. Further, the substrates 10 and 20 include, for example, an electrode 12 (first electrode) and an electrode 22 (second electrode), respectively.

At least a surface of the substrate 10, which surface makes contact with the optical modulation layer 30, has been subjected to a hydrophobic treatment. At least a surface of the substrate 20, which surface makes contact with the optical modulation layer 30, has been subjected to a hydrophilic treatment. By carrying out the hydrophobic treatment with respect to the substrate 10, the substrate 10 is to make contact with a nonpolar solvent contained in the optical modulation layer 30 which contains the nonpolar solvent and a polar solvent. Concrete examples of the hydrophobic treatment encompass (i) a method of spin-coating a substrate with fluorocarbon resin such as Teflon AF (Registered Trademark) (manufactured by DuPont) or CYTOP (manufactured by Asahi Glass Co., Ltd.) and (ii) a method of forming a parylene film on a substrate by CVD (Chemical Vapor Deposition).

By carrying out the hydrophilic treatment with respect to the substrate 20, the substrate 20 is to make contact with the polar solvent contained in the optical modulation layer 30. Concrete examples of the hydrophilic treatment encompass (i) a method of forming, on a substrate, an inorganic oxide film formed from an oxide such as silicon oxide, titanium oxide, aluminum oxide, or zinc oxide by vacuum vapor deposition, sputtering, CVD, PVD (Physical Vapor Deposition), a sol-gel method, or coating and (ii) a method of treating a surface of a substrate with an agent such as a silane coupling agent that has a polar group.

Note that it is possible to employ a configuration in which the hydrophobic treatment is carried out with respect to the substrate 20 and the hydrophilic treatment is carried out with respect to the substrate 10.

As above described, the display device of the present invention has the configuration in which one of the pair of substrates has a hydrophilic property and makes contact with the polar solvent, and the other of the pair of substrates has a hydrophobic property and makes contact with the nonpolar solvent.

Alternatively, an electrically conductive electrode film such as an ITO-deposited layer or an aluminum-deposited layer can be formed on the entire surface of each of the substrates 10 and 20 which surface faces the optical modulation layer 30. Alternatively, the electrode can be patterned so that segment display or passive display can be carried out. Alternatively, an active matrix substrate including TFTs or the like can be employed as at least one of the substrates. The following description will discuss an example case in which the substrate 10 constitutes an active matrix substrate.

Specifically, the substrate 10 includes a glass substrate 11 on which various signal lines (such as scanning signal lines and data signal lines), thin film transistors ("TFT"), and an insulating film are provided (which are not illustrated), and the electrode 12 (pixel electrode) is provided so as to cover the signal lines, the TFTs, and the insulating film. Configurations of driving circuits (such as a scanning signal line driving circuit and a data signal line driving circuit) for driving the various signal lines are identical with those of conventional ones.

The substrate 20 includes a glass substrate 21 on which the electrode 22 (common electrode) is provided.

The electrode 12, which is provided on the substrate 10, and the electrode 22, which is provided on the substrate 20, are each formed by a transparent electrically conductive film such as ITO (Indium Tin Oxide), IZO (Indium Zinc Oxide), zinc oxide, or tin oxide. The electrode 12 is provided for each of the pixels, and the electrode 22 is provided as a solid (allover) electrode common to all the pixels. Note that the electrode 22 can be provided for each of the pixels, as with the electrode 12.

The optical modulation layer 30 is provided between the electrodes 12 and 22, and contains mediums (i.e., polar solvent 31a and nonpolar solvent 31b) and a plurality of shape-anisotropic members 32 contained in the mediums. A voltage is applied to the optical modulation layer 30 from a power source 33 which is connected with the electrodes 12 and 22, and the optical modulation layer 30 changes its transmittance of light, which has entered the optical modulation layer 30 from the backlight 3, in accordance with a magnitude of the applied voltage. A thickness (i.e., cell thickness) of the optical modulation layer 30 is set based on a long-axis length of the shape-anisotropic member 32. The thickness of the optical modulation layer 30 is set to, for example, 80 μm.

The shape-anisotropic member 32 is a responsive member that rotates or is transformed in accordance with a direction of an electric field. In view of display property, an area of a projected image of the shape-anisotropic member 32 (i.e., a projected area onto the substrates 10 and 20) when viewed in a normal direction with respect to the substrates 10 and 20 is changed in accordance with the magnitude of the applied voltage. Further, it is preferable that a projected area ratio (i.e., maximum projected area:minimum projected area) is 2:1 or higher.

The shape-anisotropic member 32 has positive or negative chargeability in the medium. Specifically, examples of the shape-anisotropic member 32 encompass (i) a member that can give and receive electrons with electrodes, a medium, or the like and (ii) a member which is modified with an ionic silane coupling agent or the like.

A shape of the shape-anisotropic member 32 can be, for example, a flake shape, a columnar shape, or an ellipsoidal shape. The shape-anisotropic member 32 can be made of metal, a semiconductor, a dielectric substance, or a mixture of these. Alternatively, the shape-anisotropic member 32 can be made of a dielectric multilayer film or cholesteric resin. In a case where the shape-anisotropic members 32 are made of metal, aluminum flakes, which are generally used for coating painting, can be employed. Moreover, the shape-anisotropic member 32 can be colored. For example, the shape-anisotropic member 32 can be an aluminum flake whose diameter is 20 μm and thickness is 0.3 μm.

A specific gravity of the shape-anisotropic members 32 is preferably 11 $g/cm^3$ or lower, more preferably 3 $g/cm^3$ or lower, further preferably substantially equivalent to a specific gravity of the mediums (i.e., polar solvent 31a and nonpolar solvent 31b). This is because, in a case where the specific gravity of the shape-anisotropic members 32 is higher than that of the mediums, there occurs a problem that the shape-anisotropic members 32 precipitate or float.

A surface of the shape-anisotropic member 32 has been subjected to the hydrophilic treatment or the hydrophobic treatment. The surface treatment method can be a known method. As an example of the hydrophilic treatment, a method can be used in which a sol-gel process is carried out for coating with silicon dioxide. As an example of the hydrophobic treatment, a method can be used in which dip coating with fluorocarbon resin is carried out. Note that the shape-anisotropic member 32 itself can be made of a hydrophilic member or a hydrophobic member instead of being subjected to the surface treatment. Examples of the hydrophilic member encompass aluminum oxide. Examples of the hydrophobic member encompass PET (polyethylene terephthalate). As such, the shape-anisotropic members 32 have a hydrophilic or hydrophobic property. Note that FIG. 1 illustrates a case where the shape-anisotropic members 32 have the hydrophilic property.

The medium is configured by the polar solvent 31a that makes contact with the hydrophilic substrate 20 and the nonpolar solvent 31b that makes contact with the hydrophobic substrate 10. Each of the polar solvent 31a and the nonpolar solvent 31b is made of a material that has a light-transmitting property in a visible region. Such a material can be, for example, a liquid which hardly absorbs light in the visible region and is optionally colored with pigment. It is preferable that a specific gravity of the polar solvent 31a is equal to or similar to that of the nonpolar solvent 31b, and the specific gravities of the polar solvent 31a and the nonpolar solvent 31b are equal to or similar to the specific gravity of the shape-anisotropic member 32.

Moreover, each of the polar solvent 31a and the nonpolar solvent 31b is preferably low in volatility, by taking into consideration a step of sealing the polar solvent 31a and the nonpolar solvent 31b into a cell (i.e., the optical modulation layer 30). Moreover, viscosity of the polar solvent 31a and the nonpolar solvent 31b relates to responsiveness and is preferably 5 mPa·s or lower.

Each of the polar solvent 31a and the nonpolar solvent 31b can be formed from a single substance or from a mixture of a plurality of substances. The polar solvent 31a can be made of, for example, water; an organic solvent such as alcohol, acetone, formamide, and ethylene glycol; an ionic liquid; or a mixture thereof. The nonpolar solvent 31b can be made of silicone oil or aliphatic hydrocarbon.

As above described, the display panel 2 includes the power source 33, the hydrophilic shape-anisotropic members 32, the polar solvent 31a which makes contact with the hydrophilic substrate, and the nonpolar solvent 31b which makes contact with the hydrophobic substrate. According to the configuration, while no voltage is applied to the optical modulation layer 30, the shape-anisotropic members 32 are confined within a predetermined small area in a state of being dispersed in the polar solvent 31a. Note that, in a case where the shape-anisotropic members have a hydrophobic property, the shape-anisotropic members 32 are confined within a predetermined small area in a state of being dispersed in the nonpolar solvent 31b, while no voltage is applied to the optical modulation layer 30.

Here, a ratio (i.e., layer thickness) of the polar solvent 31a is preferably different from that of the nonpolar solvent 31b.

For example, in a case where the shape-anisotropic members 32 have the hydrophilic property (see (a) of FIG. 1), the ratio (i.e., layer thickness) of the polar solvent 31a is controlled to be smaller than that of the nonpolar solvent 31b. In this case, the layer thickness of the polar solvent 31a is preferably 1 μm. Further, the layer thickness of the polar solvent 31a is preferably controlled to be (i) identical with the thickness of the shape-anisotropic member 32 or (ii) several times larger than the thickness of the shape-anisotropic member 32. The shape-anisotropic members 32 are stably oriented in a small area which is contained in the polar solvent 31a. In a case where the shape-anisotropic members 32 are in the form of flakes, the flakes are oriented in such a manner as to stick to the hydrophilic substrate (i.e., substrate 20 in FIG. 1) (hereinafter, this orientation is also referred to as "transverse orientation").

Alternatively, in a case where the shape-anisotropic members 32 have the hydrophobic property, the ratio (i.e., layer thickness) of the nonpolar solvent 31b is controlled to be smaller than that of the polar solvent 31a. In this case, the layer thickness of the nonpolar solvent 31b is preferably 1 μm. Further, the layer thickness of the nonpolar solvent 31b is preferably controlled to be (i) identical with the thickness of the shape-anisotropic member 32 or (ii) several times larger than the thickness of the shape-anisotropic member 32. The shape-anisotropic members 32 are stably oriented in a small area which is contained in the nonpolar solvent 31b. In a case where the shape-anisotropic members 32 are in the form of flakes, the flakes are oriented in such a manner as to stick to the hydrophobic substrate (i.e., the transverse orientation).

The following description will concretely discuss a method for controlling light transmittance with the optical modulation layer 30. In the following description, the shape-anisotropic members 32 are made up of hydrophilic flakes.

Figure 2:
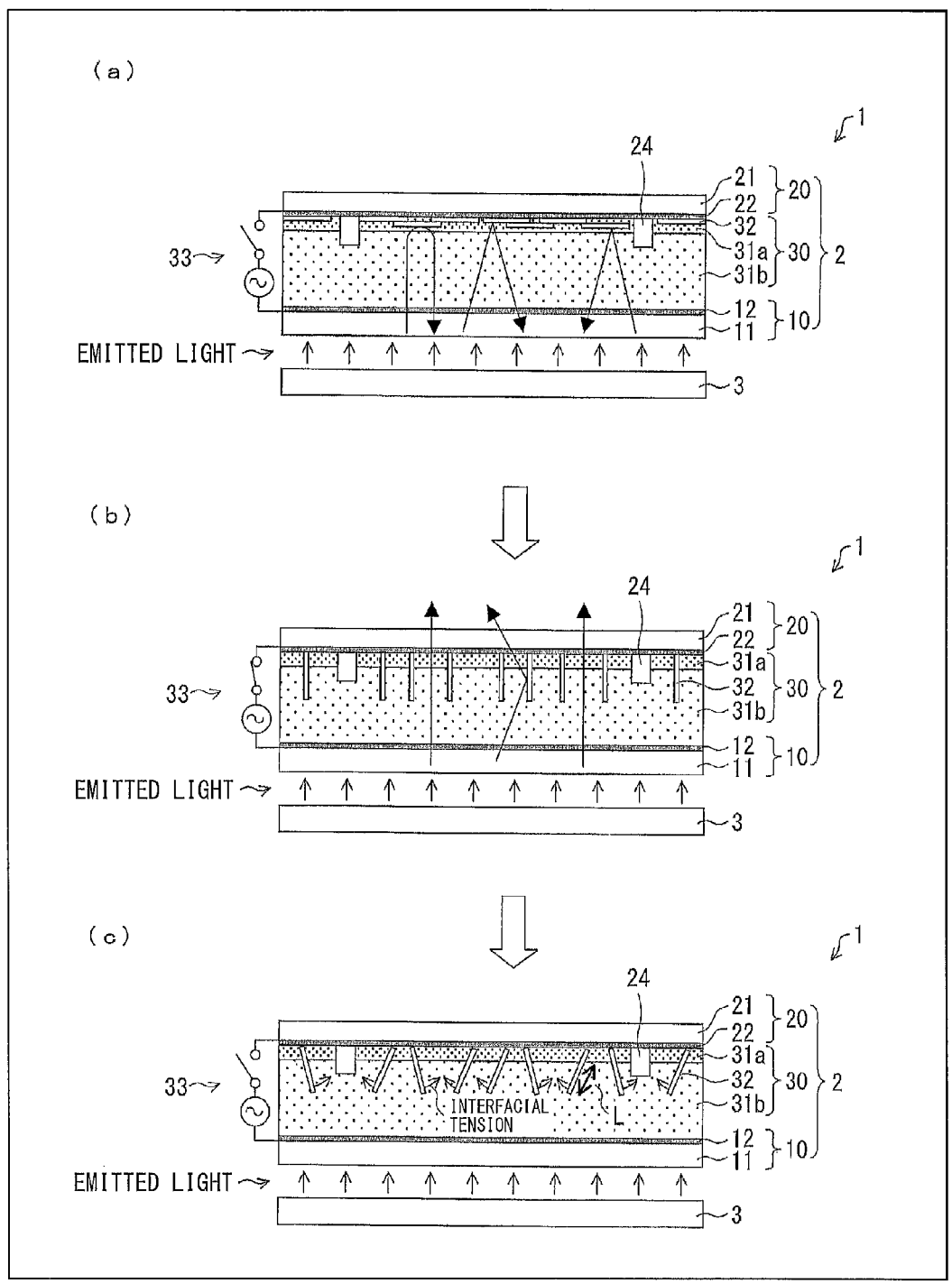
FIG. 2 is a view in which (a) illustrates how light travels in the configuration illustrated in (a) of FIG. 1, (b) illustrates how light travels in the configuration illustrated in (b) of FIG. 1, and (c) illustrates how flakes rotate by interfacial tension that is generated between a nonpolar solvent 31b and each of the flakes.

While an AC voltage or a DC voltage is not applied to the optical modulation layer 30, the flakes are confined within a predetermined small area in a state of being dispersed in the polar solvent 31a (see (a) of FIG. 2). That is, the flakes are stabilized in a location contained in the polar solvent 31a (i.e., inside the polar solvent 31a) and oriented in such a manner as to stick to the hydrophilic substrate 20 (i.e., in the transverse orientation). According to the arrangement, light which has entered the optical modulation layer 30 from the backlight 3 is blocked by the flakes and does accordingly not permeate (i.e., pass through) the optical modulation layer 30.

When an AC voltage or a DC voltage is applied to the optical modulation layer 30, the flakes are rotated, by force explained in view of dielectrophoresis phenomenon, Coulomb force, or electrical energy, such that major axes of the flakes are aligned in parallel with the line of electric force as illustrated in (b) of FIG. 2. That is, the flakes are oriented such that their major axes become perpendicular to the substrates 10 and 20 (hereinafter, also referred to as "longitudinal orientation"). This allows light, which has been emitted by the backlight 3 and entered the optical modulation layer 30, to permeate (i.e., pass through) the optical modulation layer 30 so as to travel toward the viewer side.

When the application of the voltage to the optical modulation layer 30 as illustrated in (b) of FIG. 2 is terminated, the flakes are rotated as illustrated in (c) of FIG. 2 by interfacial tension that is generated between the nonpolar solvent 31b and each of the flakes, and are ultimately oriented such that their major axes are aligned in parallel with the substrates 10 and 20 (i.e., transverse orientation) as illustrated in (a) of FIG. 2. This causes light, which has been emitted by the backlight 3 and entered the optical modulation layer 30, to be blocked by the flakes, and therefore the light no longer permeates (i.e., passes through) the optical modulation layer 30.

In which orientation (such as the longitudinal orientation, the transverse orientation, an intermediate orientation, or an orientation inclined by a predetermined degree with respect to the transverse orientation) the flakes are aligned is determined based on a balance between (i) torque that causes the rotation and (ii) interfacial tension that relates to a length L (see (c) of FIG. 2) of the flakes which get into the nonpolar solvent 31b. For example, in a case where the layer thickness of the polar solvent 31a is sufficiently larger than the thickness of the flake, the inclination of the flakes cannot be fully controlled unless utilizing gravity, etc., from when the application of voltage is terminated to when the flakes start to get into the nonpolar solvent 31b. On the other hand, in a case where (i) the layer thickness of the polar solvent 31a is controlled to be equal to or smaller (i.e., thinner) than the thickness of the flake or (ii) an amount of the flakes to be provided is larger than that of flakes required to cover the display surface (i.e., substrate surface) in the transverse orientation and the layer thickness of the polar solvent 31a is controlled to be equal to or smaller (i.e., thinner) than a total thickness of several flakes, it is possible to reduce or cancel so-called play (i.e., allowance) of the flakes and it is therefore possible to control the inclination of the flakes.

An advantage of a configuration, in which the layer thickness of the polar solvent 31a is sufficiently larger (i.e., thicker) than the thickness of the flake, is that torque for rotating the flakes can be surely secured by applying a voltage because a normal direction with respect to a flake surface can be averagely slightly inclined with respect to the line of electric force.

For example, in a case where (i) the flakes are modified with an ionic silane coupling agent or the like so as to be positively or negatively charged in a medium and (ii) a DC voltage is applied, it is possible to utilize (a) force causing transverse orientation by interfacial tension and (b) electrophoretic force. This makes it possible to further increase a response speed.

By thus switching whether or not to apply a voltage to the optical modulation layer 30, it is possible to switch between the longitudinal orientation and the transverse orientation of the flakes so as to change transmittance of light (i.e., amount of transmitted light) which has been emitted by the backlight 3 and entered the optical modulation layer 30.

In particular, in a case where the flakes are made of a conductor such as metal and a voltage is applied, the flakes may aggregate to form a bridge between electrodes. However, the configuration of the present embodiment can prevent (i) hydrophilic flakes from being actively dispersed in the nonpolar solvent and (ii) hydrophobic flakes from being actively dispersed in the polar solvent, and it is therefore possible to reduce such aggregation which forms the bridge.

Here, in a case where the shape-anisotropic members 32 are in the form of flakes, a thickness of the flake is preferably 1 μm or less, more preferably 0.1 μm or less. As the thickness of the flake become thinner, the transmittance can be increased.

Figure 3:
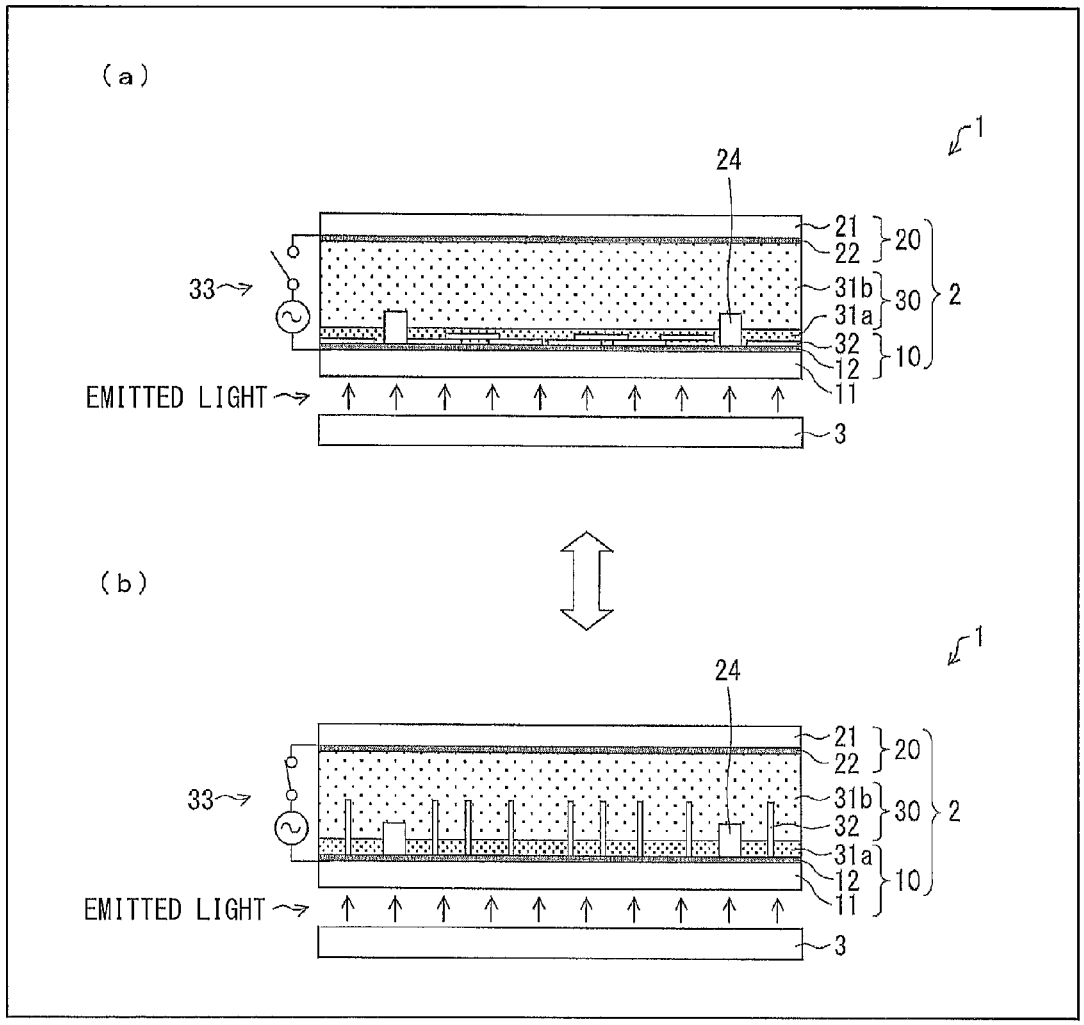
FIG. 3 is a cross-sectional view illustrating, in (a) and (b), a modification example of the display device illustrated in FIG. 1.

Each of (a) and (b) of FIG. 3 is a cross-sectional view schematically illustrating a configuration of the display device 1 in accordance with a modification example. According to the modification example, the glass substrate 11 is subjected to hydrophilic treatment, the glass substrate 21 is subjected to hydrophobic treatment, the polar solvent 31a makes contact with the substrate 10, and the nonpolar solvent 31b makes contact with the substrate 20. Moreover, the flakes (i.e., the shape-anisotropic members 32) are subjected to hydrophilic treatment. According to the configuration, the flakes are stabilized in such a manner as to stick to the substrate 10 (i.e., transverse orientation) while no voltage is applied (see (a) of FIG. 3), and the flakes are aligned in the longitudinal orientation on the substrate 10 side while a voltage is applied (see (b) of FIG. 3).

Figure 4:
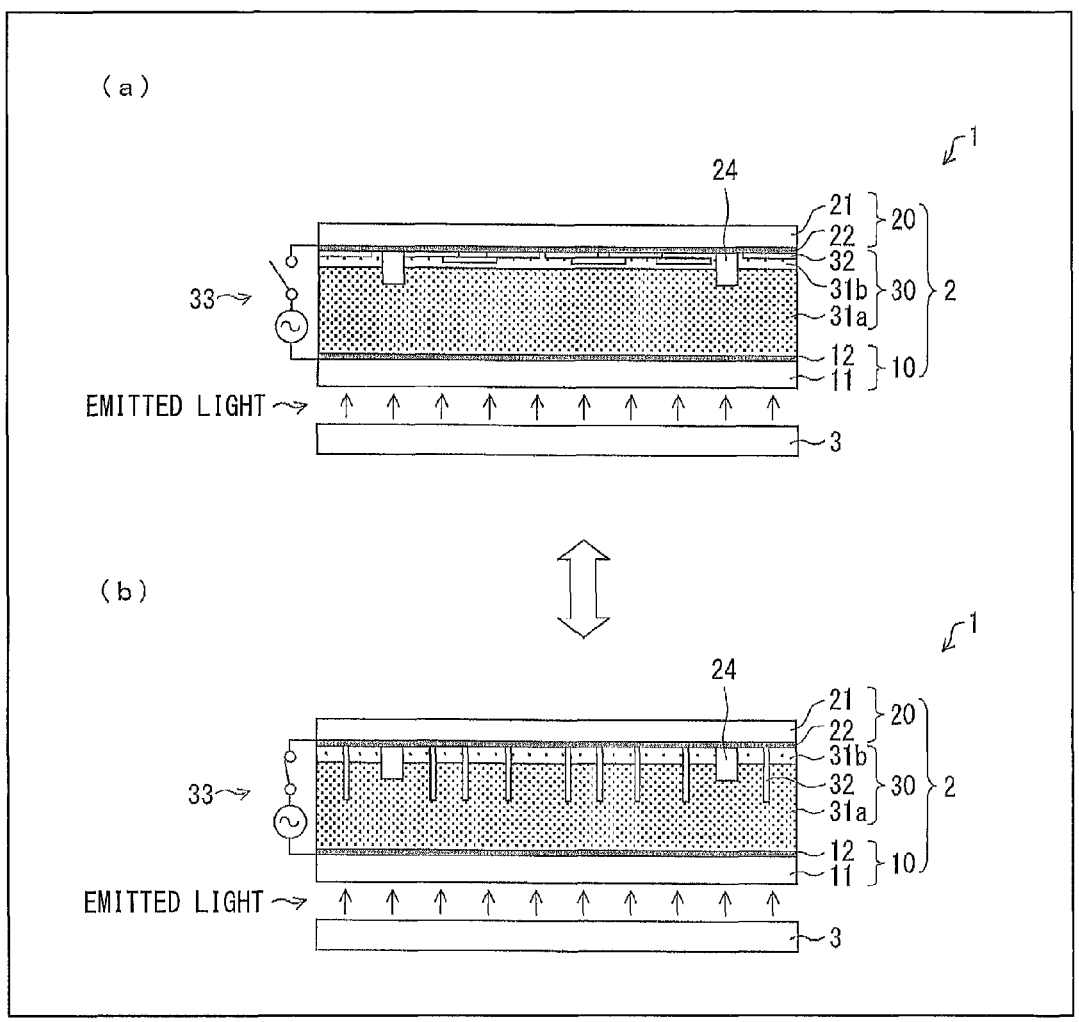
FIG. 4 is a cross-sectional view illustrating, in (a) and (b), another modification example of the display device illustrated in FIG. 1.

Each of (a) and (b) of FIG. 4 is a cross-sectional view schematically illustrating a configuration of the display device 1 in accordance with another modification example. According to the modification example, the glass substrate 11 is subjected to hydrophilic treatment, the glass substrate 21 is subjected to hydrophobic treatment, the polar solvent 31a makes contact with the substrate 10, and the nonpolar solvent 31b makes contact with the substrate 20. Moreover, the flakes (i.e., the shape-anisotropic members 32) are subjected to hydrophobic treatment. According to the configuration, the flakes are stabilized in such a manner as to stick to the substrate 20 (i.e., transverse orientation) while no voltage is applied (see (a) of FIG. 4), and the flakes are aligned in the longitudinal orientation on the substrate 20 side while a voltage is applied (see (b) of FIG. 4), as with the configuration illustrated in FIG. 1. Note that, in this case, a ratio (i.e., layer thickness) of the nonpolar solvent 31b is smaller than that of the polar solvent 31a.

In the display panel 2, a rib 24 is provided on a substrate (in FIG. 1, substrate 20) to which the flakes stick. This makes it possible to prevent a bias in flake density which is caused by aggregation and the like by the gravity and voltage application.

Figure 5:
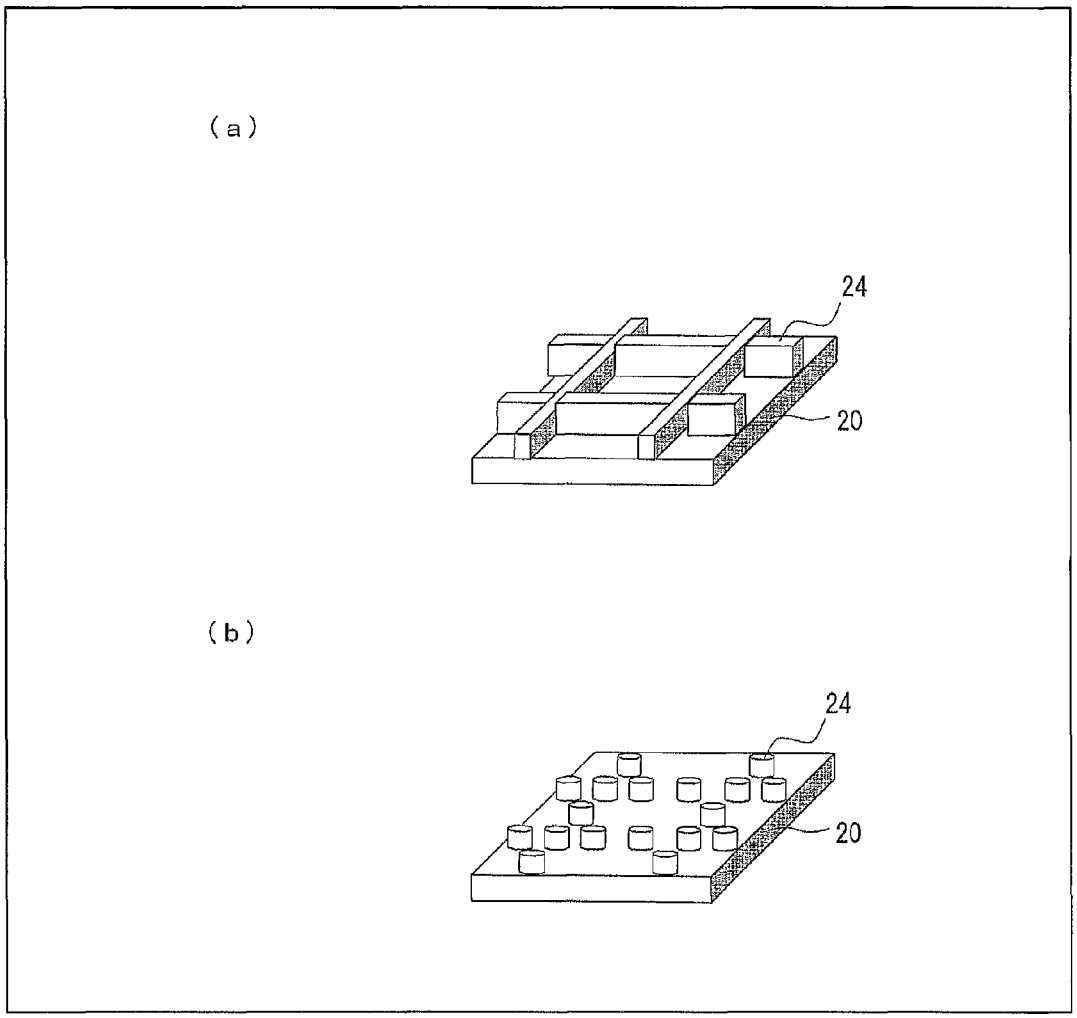
FIG. 5 is a perspective view in which (a) illustrates a rib having a lattice shape and (b) illustrates ribs arranged in a pattern of islands.

A shape of the rib 24 is not limited to a particular one, provided that the rib 24 serves to prevent the flakes from moving so as to bias in an in-plane direction. For example, the rib 24 can have a lattice shape as illustrated in (a) of FIG. 5 or the ribs 24 can be arranged in a pattern of islands as illustrated in (b) of FIG. 5. Note that the rib 24 illustrated in FIG. 1 has the lattice shape (as illustrated in (a) of FIG. 5). In a case of, for example, a display device having a plurality of pixels, each of areas, which are partitioned by the rib 24, can have (i) a size that corresponds to an area of one (1) pixel, (ii) a size that corresponds to each of a plurality of areas in one (1) pixel, or (iii) a size that corresponds to an area containing a plurality of pixels.

A height of the rib 24 is not limited to a particular one, provided that the height is equal to or greater than the layer thickness of the polar solvent 31a or the nonpolar solvent 31b in which the flakes are dispersed. For example, in a case where the height of the rib 24 is set to be equivalent to an intended cell thickness, the rib 24 can serve as a spacer for securing a distance between the substrate 10 and the substrate 20. Alternatively, in a case where the height is set to be (i) equivalent to or greater than the layer thickness of the polar solvent 31a or the nonpolar solvent 31b in which the flakes are dispersed and (ii) approximately 5 μm or lower, a width of the rib 24 can be set to extremely small and it is therefore possible to reduce an area in which the flakes do not exit.

A material of the rib 24 is not limited to a particular one, provided that the above described shape can be formed. For example, the rib 24 can be made of a photosensitive resin for forming a general resin spacer.

The rib 24 can be formed on the substrate after being subjected to hydrophobic treatment or hydrophilic treatment. However, it is preferable to first form the rib 24 on the substrate and then carry out hydrophobic treatment or hydrophilic treatment, in order to keep constant locations of the solvents in the vicinity of the rib 24 and in view of easiness in process.

By thus forming the rib 24, it is possible to confine the flakes, which are dispersed in the polar solvent 31a (or the nonpolar solvent 31b), within a compartment or continuous compartments surrounded by the substrate, the rib 24, and the nonpolar solvent 31b (or the polar solvent 31a).

Embodiment 2

The following description will discuss a display device in accordance with Embodiment 2 of the present invention, with reference to the drawings.

Note that the descriptions below mainly discuss differences from the display device of Embodiment 1, the same reference numerals are given to constituent elements having functions identical to those described in Embodiment 1, and such constituent elements will not be described repeatedly.

Figure 6:
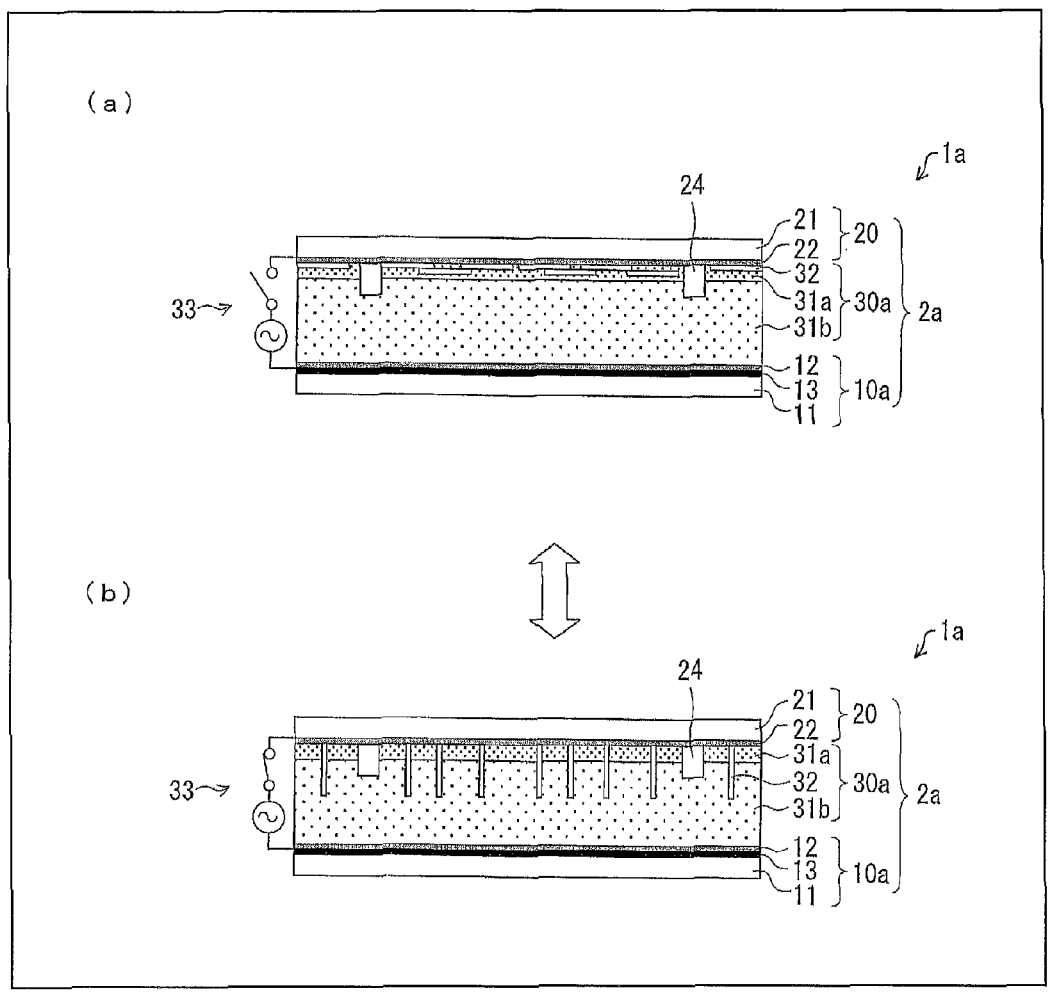
FIG. 6 is a cross-sectional view schematically illustrating, in (a) and (b), a configuration of a display device in accordance with Embodiment 2.

Each of (a) and (b) of FIG. 6 is a cross-sectional view schematically illustrating a configuration of a display device 1a in accordance with Embodiment 2. The display device 1a includes a display panel 2a and a driving circuit (not illustrated), and is a reflection type display device which carries out a display by reflecting outside light which has entered the display panel 2a.

The display panel 2a includes (i) substrates 10a and 20 which are arranged to face each other and (ii) an optical modulation layer 30a which is provided between the substrates 10a and 20. The substrate 10a (first substrate) is provided on a rear surface side of the display panel 2a, and the substrate 20 (second substrate) is provided on a display surface side (i.e., viewer side). The display panel 2a has a plurality of pixels which are arranged in a matrix manner.

The substrate 10a includes (i) an insulating substrate 11 made of, for example, transparent glass and (ii) an electrode 12 (first electrode). The substrate 20 includes (i) an insulating substrate 21 made of, for example, transparent glass and (ii) an electrode 22 (second electrode).

As with the display device 1 of Embodiment 1 (illustrated in FIG. 1), the substrate 10a has a hydrophobic property, and the substrate 20 has a hydrophilic property.

The substrate 10a constitutes an active matrix substrate. Specifically, the substrate 10a includes the glass substrate 11 on which various signal lines (such as scanning signal lines and data signal lines), thin film transistors ("TFT"), and an insulating film are provided (which are not illustrated), and a light absorbing layer 13 and the electrode 12 are stacked thereon. The light absorbing layer 13 has a property to absorb, out of light entered the light absorbing layer 13, at least light whose wavelength falls within a predetermined range. The light absorbing layer 13 can be colored and can be colored in, for example, black.

The substrate 20 includes an electrode 22 (i.e., common electrode) which is provided on the glass substrate 21.

The optical modulation layer 30a is provided between the electrodes 12 and 22 and has (i) mediums (i.e., polar solvent 31a and nonpolar solvent 31b) and (ii) a plurality of shape-anisotropic members 32a which are contained in the mediums. When a voltage is applied to the optical modulation layer 30a from a power source 33 which is connected with the electrodes 12 and 22, the optical modulation layer 30a changes, in accordance with a magnitude of the voltage, reflectance of light (i.e., outside light) which has entered the optical modulation layer 30a from outside.

The shape-anisotropic member 32a is a responsive member that rotates or is transformed in accordance with a direction of an electric field. In view of display property, an area of a projected image of the shape-anisotropic member 32a (i.e., a projected area onto the substrates 10a and 20) when viewed in a normal direction with respect to the substrates 10a and 20 is changed in accordance with the magnitude of the applied voltage. Further, it is preferable that a projected area ratio (i.e., maximum projected area: minimum projected area) is 2:1 or higher.

The shape-anisotropic member 32a has positive or negative chargeability in the medium. Specifically, examples of the shape-anisotropic member 32a encompass (i) a member that can give and receive electrons with electrodes, a medium, or the like and (ii) a member which is modified with an ionic silane coupling agent or the like.

A shape of the shape-anisotropic member 32a can be, for example, a flake shape, a columnar shape, or an ellipsoidal shape. The shape-anisotropic members 32a have a property to reflect visible light, and can be made of, for example, metal such as aluminum. Moreover, the shape-anisotropic members 32a can be colored. The shape-anisotropic members 32a are subjected to hydrophilic treatment on their surfaces. The other properties of the shape-anisotropic members 32a are identical with those of the shape-anisotropic members 32 described in Embodiment 1.

As with Embodiment 1, the medium contains (i) a polar solvent 31a which makes contact with the hydrophilic substrate 20 and (ii) a nonpolar solvent 31b which makes contact with the hydrophobic substrate 10.

The following description will discuss a concrete method for controlling light reflectance by the optical modulation layer 30a. In this case, the shape-anisotropic members 32a are made up of hydrophilic aluminum (Al) flakes.

Figure 7:
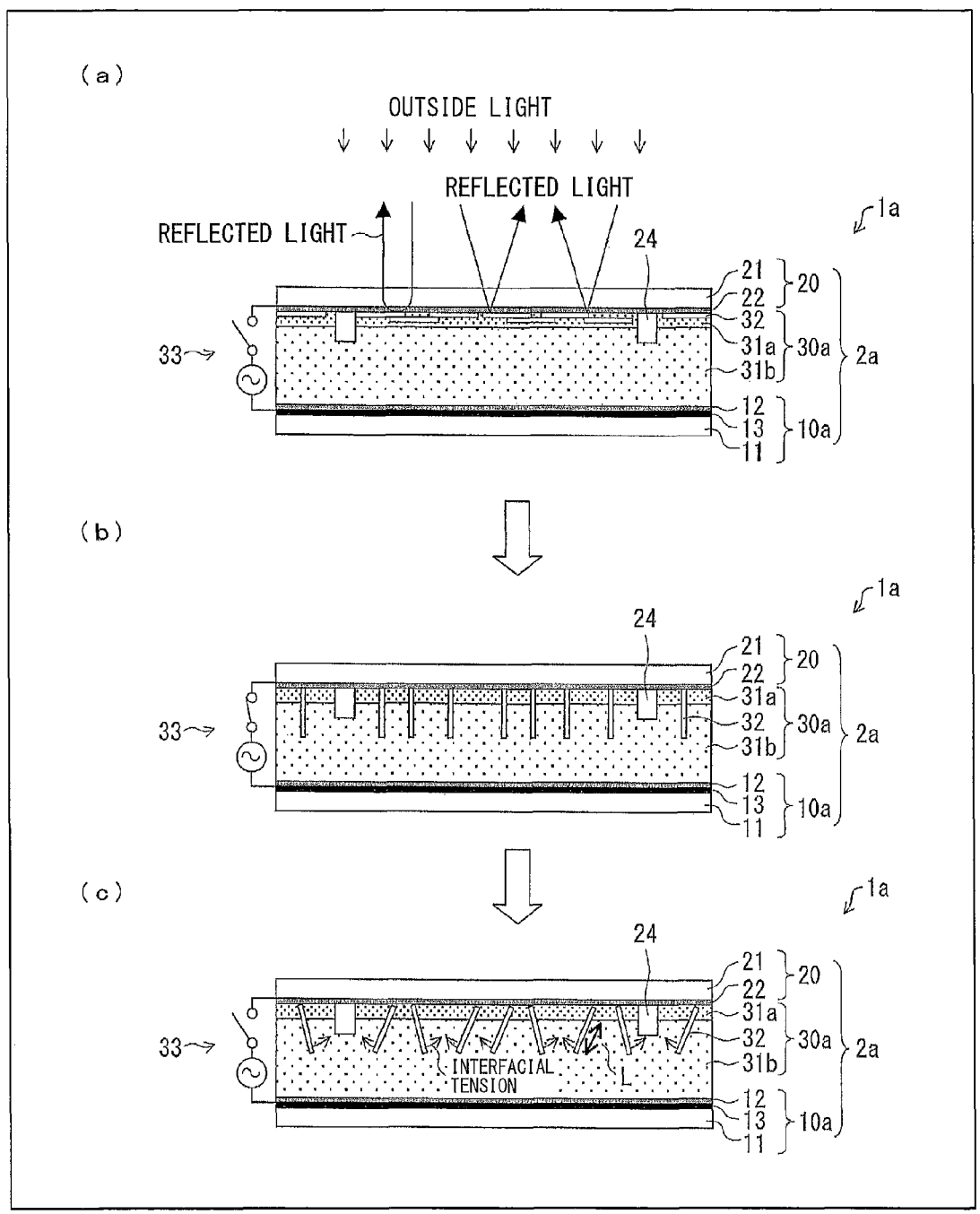
FIG. 7 is a view in which (a) illustrates how light travels in the configuration illustrated in (a) of FIG. 6, (b) illustrates how light travels in the configuration illustrated in (b) of FIG. 6, and (c) illustrates how flakes rotate by interfacial tension that is generated between a nonpolar solvent 31b and each of the flakes.

While an AC voltage or a DC voltage is not applied to the optical modulation layer 30a, the flakes are confined in a predetermined small area while being dispersed in the polar solvent 31a (see (a) of FIG. 7). That is, the flakes are stabilized in a location contained in the polar solvent 31a (i.e., inside the polar solvent 31a) and oriented in such a manner as to stick to the hydrophilic substrate 20 (i.e., in the transverse orientation). According to the arrangement, outside light which has entered the optical modulation layer 30a is reflected by the flakes and it is therefore possible to carry out reflection display.

When an AC voltage or a DC voltage is applied to the optical modulation layer 30a, the flakes are rotated, by force explained in view of dielectrophoresis phenomenon, Coulomb force, or electrical energy, such that major axes of the flakes are aligned in parallel with the line of electric force as illustrated in (b) of FIG. 7. That is, the flakes are oriented such that their major axes become perpendicular to the substrates 10a and 20 (i.e., in the longitudinal orientation). This allows the outside light, which has entered the optical modulation layer 30a, to permeate (i.e., pass through) the optical modulation layer 30a so as to be absorbed by the light absorbing layer 13. In this case, the viewer is to view black of the light absorbing layer 13 (i.e., black display).

When the application of the voltage to the optical modulation layer 30a as illustrated in (b) of FIG. 7 is terminated, the flakes are rotated as illustrated in (c) of FIG. 7 by interfacial tension that is generated between the nonpolar solvent 31b and each of the flakes, and are ultimately oriented such that their major axes are aligned in parallel with the substrates 10a and 20 (i.e., transverse orientation) as illustrated in (a) of FIG. 7. This allows outside light, which has entered the optical modulation layer 30a, to be reflected by the flakes and thus reflection display is carried out.

In a case where the colored layer (i.e., the light absorbing layer 13) is thus provided on the rear surface side of the display panel 2a, (i) a color of light reflected by the flakes is viewed when the flakes are in the transverse orientation and (ii) the colored layer is viewed when the flakes are in the longitudinal orientation. For example, in a case where the colored layer is in black and the flakes are metal flakes, reflection by the metal flakes is obtained in the transverse orientation, and a black display is obtained in the longitudinal orientation. Alternatively, white display can be obtained by scattering of reflected light in a case where, for example, (i) the metal flakes are formed to have an average diameter of 20 μm or smaller, (ii) each of the flakes is formed to have uneven surface for achieving light-scattering property, or (iii) each of the flakes is formed to have a contour that has deep indentations.

In a case where (i) the flakes are aligned on the substrate 20 side (i.e., the viewer side) as illustrated in (a) of FIG. 7 and (ii) an amount of the flakes contained in the medium is large, e.g., the amount is more than an amount of flakes required for covering the substrate 20 surface with one (1) layer of flakes in the transverse orientation, reflection surfaces of the respective flakes are viewed as a single surface (i.e., flush reflection surface) from the viewer side. This makes it possible to obtain a highly specular display (i.e., mirror reflection).

Figure 8:
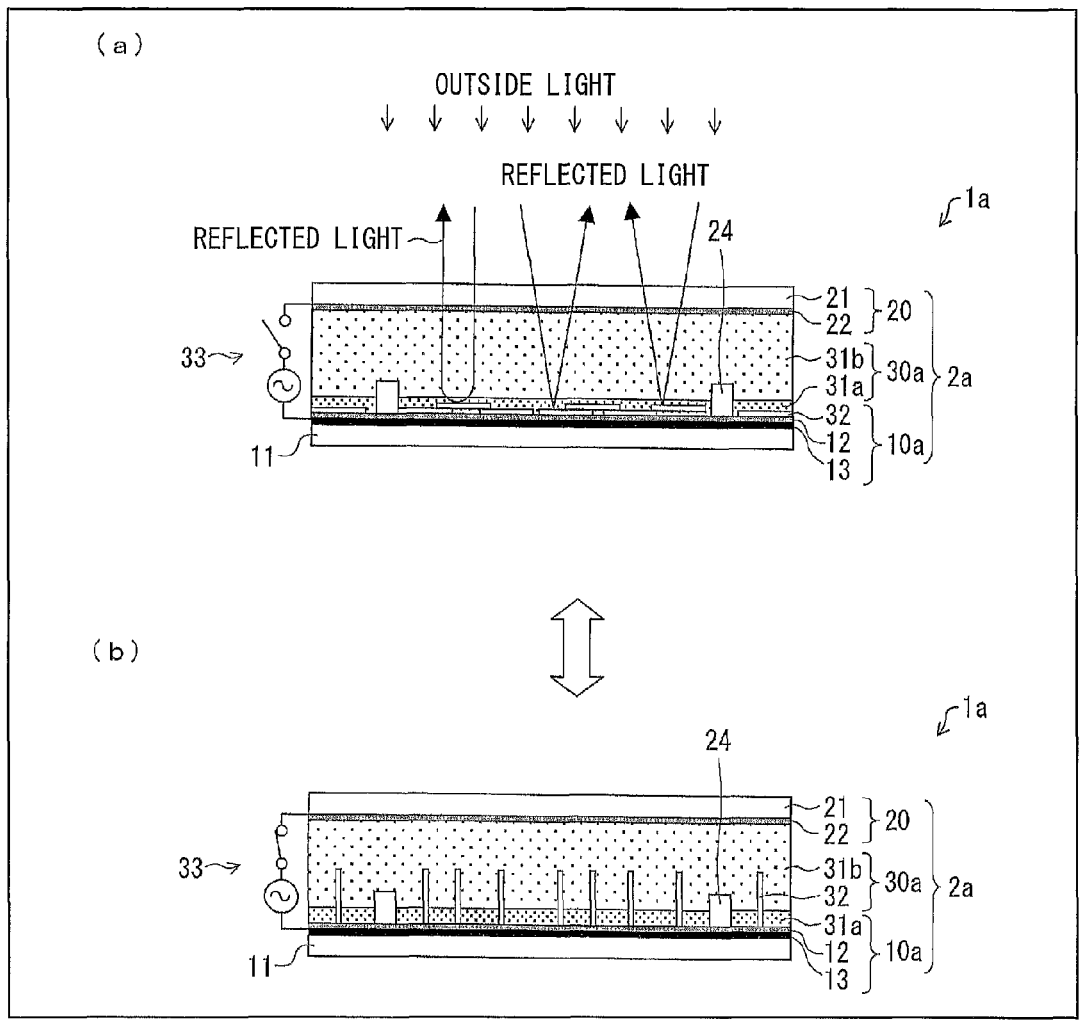
FIG. 8 is a view illustrating, in (a) and (b), how light travels in a case where flakes are provided in the vicinity to a substrate on a rear surface side in the display device illustrated in FIG. 6.

In a case where the flakes are aligned on the substrate 10a side (i.e., the rear surface side) as illustrated in (a) of FIG. 8, the flakes are viewed from the viewer side as being piled up to form an uneven surface by the plurality of flakes. This makes it possible to obtain a highly scattering display. Note that (b) of FIG. 8 illustrates a state in which the flakes are in the longitudinal orientation. Here, the configuration (modification example) illustrated in FIG. 3 can be applied also to the configuration illustrated in FIG. 8.

In a case where a color filter (not illustrated) is provided on the substrate 20 and the flakes are aligned on the substrate 20 side (i.e., the viewer side) as illustrated in (a) of FIG. 7, a parallax between the optical modulation layer 30a and the color filter can be inhibited, and it is therefore possible to achieve a high quality color display.

Figure 9:
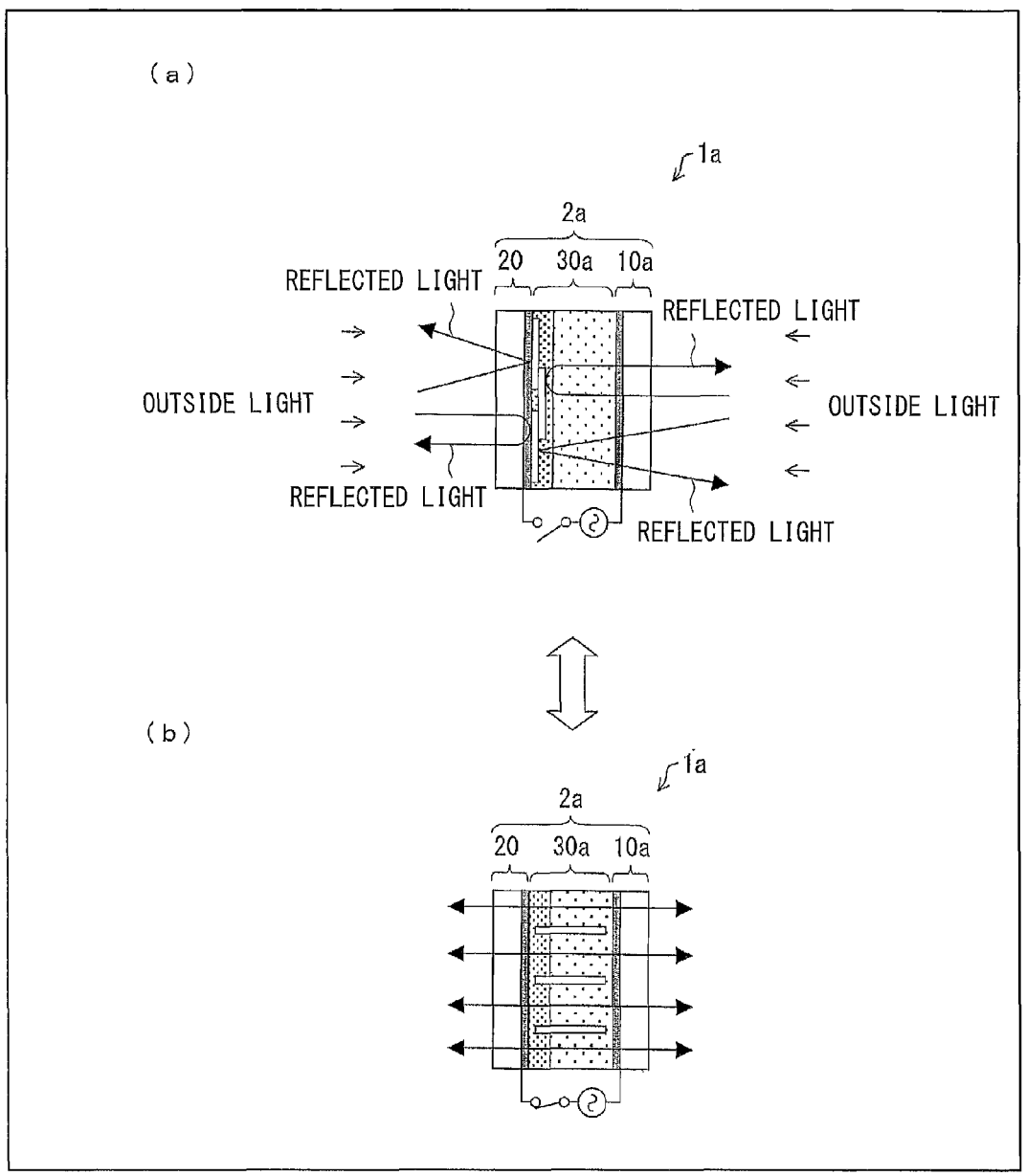
FIG. 9 is a view illustrating, in (a) and (b), how light travels in a case where the display device in accordance with Embodiment 2 is configured as a see-through display device.

In a case where, in the display device 1a, (i) the light absorbing layer 13 is a transparent layer or (ii) the light absorbing layer 13 is not provided, outside light, which has entered the optical modulation layer 30a, can be reflected by the shape-anisotropic members 32a so that a reflection display is achieved also on the rear surface side (i.e., the substrate 10a side) (see (a) and (b) of FIG. 9). In a case where the shape-anisotropic members 32a are in the longitudinal orientation, the viewer can view an opposite side of the display panel 2a through the display panel 2a, and it is therefore possible to provide a so-called see-through display panel. The display device 1a having such a configuration is suitable for, for example, a shop window.

Note that the display device 1a can have a configuration in which a light reflecting layer for regular reflection or scatter reflection is provided on the rear surface side of the display panel 2a instead of the light absorbing layer 13, the flakes are made up of colored members, a colored display is carried out when the flakes are in the transverse orientation, and a reflection display is carried out by the reflecting layer when the flakes are in the longitudinal orientation.

The display device 1a of the present embodiment can be provided, for example, on a non-display surface (e.g., a body surface which is not a general image display surface) of a mobile phone. In a case where each of the electrodes 12 and 22 of the display device 1a in such a mobile phone is configured by a transparent electrode, a body color of the mobile phone can be displayed on the non-display surface by causing the flakes to be in the longitudinal orientation. Meanwhile, by causing the flakes to be in the transverse orientation, a color(s) of the flakes can be displayed on the non-display surface or outside light can be reflected by the non-display surface. Note that the non-display surface can be used as a mirror (i.e., mirror reflection) by causing the flakes to be in the transverse orientation. According to the display device 1a having such a configuration, each of the electrodes 12 and 22 can be configured as a segment electrode or as a solid (allover) electrode. This makes it possible to simplify a circuit configuration.

The display device 1a of the present embodiment can be applied, for example, to a 2D/3D-switchable display panel. Specifically, the display device 1a is provided on a front surface of a general liquid crystal display panel as a switchable panel. In such a case of the display device 1a, black-colored flakes are arranged in stripes. When a 2D display is carried out, the flakes are controlled to be in the longitudinal orientation so that an image can be viewed which is displayed on an entire surface of the liquid crystal display panel. When a 3D display is carried out, the flakes are controlled to be arranged in stripes in the transverse orientation so that a right image and a left image, which are displayed on the liquid crystal display panel, are recognized as a stereoscopic image. This makes it possible to provide the liquid crystal display device which is switchable between 2D display and 3D display. Moreover, the above configuration can be applied to a liquid crystal display device which carries out multiple view display such as dual-view.

Embodiment 3

The following description will discuss a display device in accordance with Embodiment 3 of the present invention, with reference to the drawings.

Note that the descriptions below mainly discuss differences from the display devices of Embodiments 1 and 2, the same reference numerals are given to constituent elements having functions identical to those described in Embodiments 1 and 2, and such constituent elements will not be described repeatedly.

Figure 10:
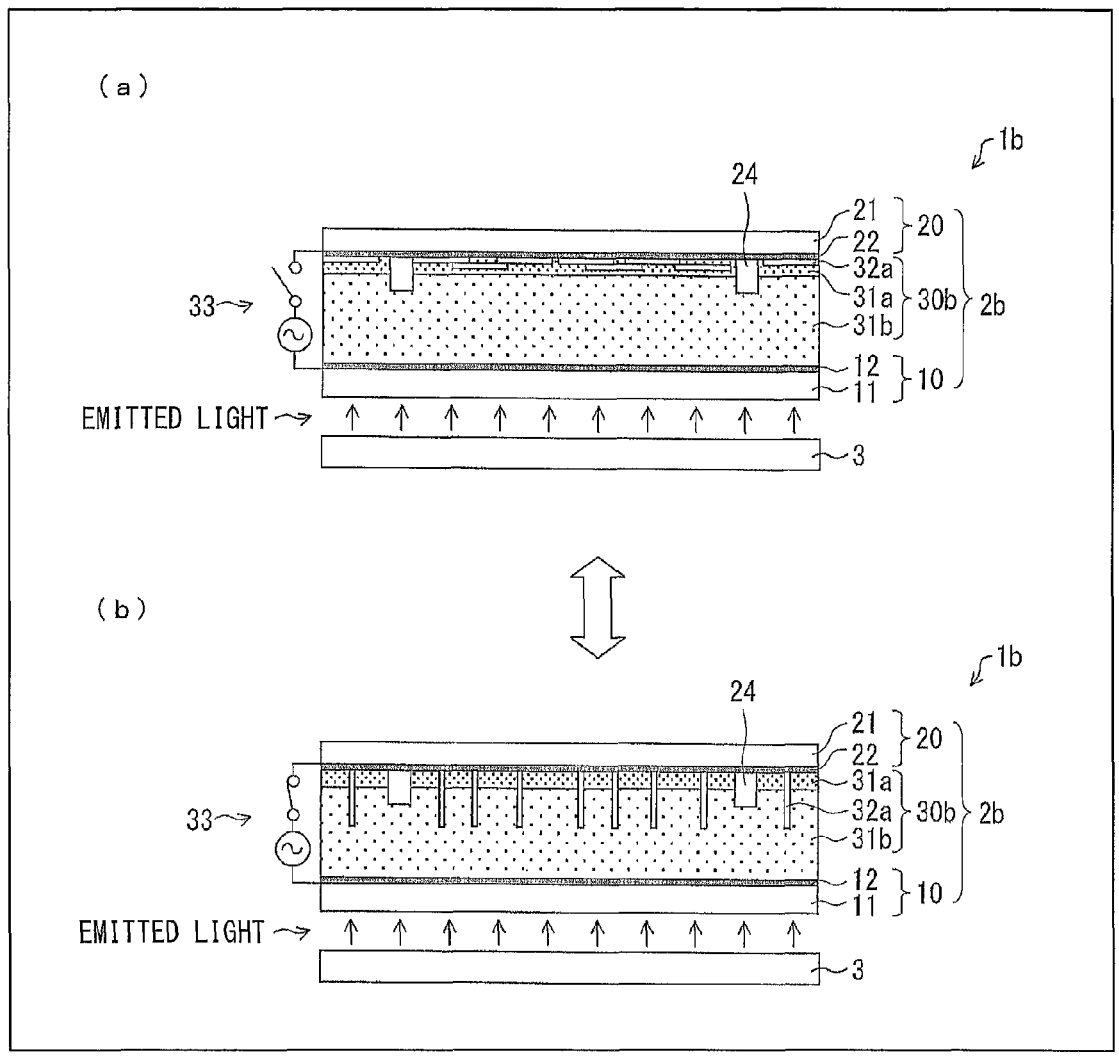
FIG. 10 is a cross-sectional view schematically illustrating, in (a) and (b), a configuration of a display device in accordance with Embodiment 3.

Each of (a) and (b) of FIG. 10 is a cross-sectional view schematically illustrating a configuration of a display device 1b in accordance with Embodiment 3. The display device 1b is a so-called transflective display device (i) which includes a display panel 2b, a backlight 3 for emitting light to the display panel 2b, and a driving circuit (not illustrated) and (ii) carries out display by allowing light, emitted by the backlight 3, to pass through and carries out display by reflecting incoming outside light.

The display panel 2b includes (i) substrates 10 and 20 which are arranged to face each other and (ii) an optical modulation layer 30b which is provided between the substrates 10 and 20. The substrate 10 (first substrate) is provided on a rear surface side of the display panel 2b, and the substrate 20 (second substrate) is provided on a display surface side (i.e., viewer side). The display panel 2b has a plurality of pixels which are arranged in a matrix manner.

The substrate 10 includes (i) an insulating substrate 11 made of, for example, transparent glass and (ii) an electrode 12 (first electrode). The substrate 20 includes (i) an insulating substrate 21 made of, for example, transparent glass and (ii) an electrode 22 (second electrode).

The configuration of the substrates 10 and 20 is identical with that of Embodiment 1, and the substrate 10 has a hydrophobic property, and the substrate 20 has a hydrophilic property.

The optical modulation layer 30b is provided between the electrodes 12 and 22 and has (i) mediums (i.e., polar solvent 31a and nonpolar solvent 31b) and (ii) a plurality of shape-anisotropic members 32a which are contained in the mediums. When a voltage is applied to the optical modulation layer 30b from a power source 33 which is connected with the electrodes 12 and 22, the optical modulation layer 30b changes, in accordance with a magnitude of the voltage, (i) a transmittance of light emitted by the backlight 3 and entered the optical modulation layer 30b and (ii) a reflectance of light (i.e., outside light) entered the optical modulation layer 30b from outside.

The configuration of the shape-anisotropic member 32a is identical with that described in Embodiment 2. That is, the shape-anisotropic member 32a is a responsive member that rotates or is transformed in accordance with a direction of an electric field, and reflects visible light. The shape-anisotropic members 32a can be, for example, aluminum (Al) flakes. Moreover, the shape-anisotropic members 32a are subjected to hydrophilic treatment on their surfaces. Note that the shape-anisotropic member 32a can have positive or negative chargeability in the medium.

As with Embodiment 1, the medium contains (i) a polar solvent 31a which makes contact with the hydrophilic substrate 20 and (ii) a nonpolar solvent 31b which makes contact with the hydrophobic substrate 10.

The following description will discuss a concrete method for controlling light transmittance and reflectance by the optical modulation layer 30b. In this case, the shape-anisotropic members 32a are made up of hydrophilic aluminum (Al) flakes.

Figure 11:
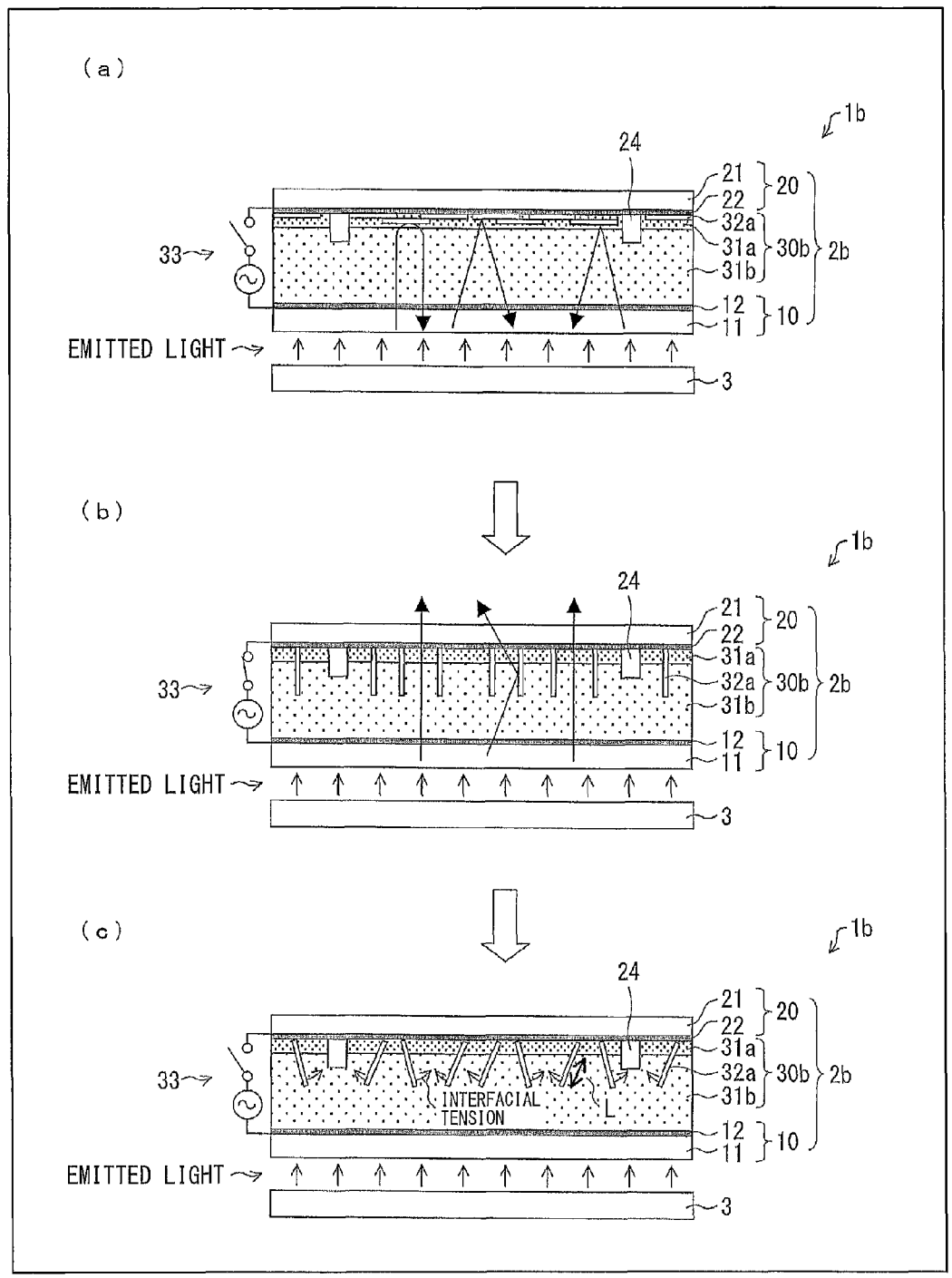
FIG. 11 is a view in which (a) illustrates how light travels in the configuration illustrated in (a) of FIG. 10, (b) illustrates how light travels in the configuration illustrated in (b) of FIG. 10, and (c) illustrates how flakes rotate by interfacial tension that is generated between a nonpolar solvent 31b and each of the flakes.

While an AC voltage or a DC voltage is not applied to the optical modulation layer 30b, the flakes are confined in a predetermined small area while being dispersed in the polar solvent 31a (see (a) of FIG. 11). That is, the flakes are stabilized in a location contained in the polar solvent 31a (i.e., inside the polar solvent 31a) and oriented in such a manner as to stick to the hydrophilic substrate 20 (i.e., in the transverse orientation). According to the arrangement, outside light which has entered the optical modulation layer 30b is reflected by the flakes and it is therefore possible to carry out reflection display.

When an AC voltage or a DC voltage is applied to the optical modulation layer 30b, the flakes are rotated, by force explained in view of dielectrophoresis phenomenon, Coulomb force, or electrical energy, such that major axes of the flakes are aligned in parallel with the line of electric force as illustrated in (b) of FIG. 11. That is, the flakes are oriented such that their major axes become perpendicular to the substrates 10 and 20 (i.e., in the longitudinal orientation). This allows light, which has been emitted by the backlight 3 and entered the optical modulation layer 30b, to permeate (i.e., pass through) the optical modulation layer 30b so as to travel toward the viewer side. This makes it possible to achieve transmissive display.

When the application of the voltage to the optical modulation layer 30b as illustrated in (b) of FIG. 11 is terminated, the flakes are rotated as illustrated in (c) of FIG. 11 by interfacial tension that is generated between the nonpolar solvent 31b and each of the flakes, and are ultimately oriented such that their major axes are aligned in parallel with the substrates 10 and 20 (i.e., transverse orientation) as illustrated in (a) of FIG. 11. This allows outside light, which has entered the optical modulation layer 30b, to be reflected by the flakes and thus reflection display is carried out.

The transflective display device 1b of Embodiment 3 is not limited to the above described configuration, and can have the following configuration. In the following modification example, a display device 1c (not illustrated) will be discussed.

The display device 1c carries out (i) transmissive display by utilizing light of a backlight in a relatively dark place such as an indoor space (transmissive mode) and (ii) reflection display by utilizing outside light in a relatively bright place such as an outdoor space (reflection mode). This makes it possible to achieve high contrast display regardless of surrounding brightness. That is, the display device 1c can carry out display under any illumination (i.e., light environment) regardless of whether the display device 1c is indoor or outdoor, and the display device 1c is therefore suitable for a mobile apparatuses such as a mobile phone, a PDA, and a digital camera.

According to the display device 1c, each of pixels in a display panel 2c has a reflection display section for reflection mode and a transmissive display section for transmissive mode. On a substrate 10c in the display panel 2c, (i) transparent electrodes (i.e., pixel electrodes) made of ITO or the like are provided in the respective transmissive display sections and (ii) reflecting electrodes (i.e., pixel electrodes) made of aluminum or the like are provided in the respective reflection display sections. On a substrate 20c in the display panel 2c, a common electrode is provided which faces the electrodes on the substrate 10c and is made of ITO or the like. In an optical modulation layer 30c, shape-anisotropic members 32c are provided, and the shape-anisotropic members 32c are made of a material that does not reflect visible light.

The display device 1c can be configured to include a sensor for detecting surrounding brightness so as to switch between a transmissive display mode and a reflection display mode in accordance with the surrounding brightness.

According to the configuration of the display device 1c, the backlight can be turned off during the reflection display mode, and it is therefore possible to reduce power consumption.

As above described, each of the display devices 1b and 1c is configured to carry out display while switching between the reflection display mode and the transmissive display mode.

Embodiment 4

The following description will discuss a display device in accordance with Embodiment 4 of the present invention, with reference to the drawings.

Note that the descriptions below mainly discuss differences from the display devices of Embodiments 1 through 3, the same reference numerals are given to constituent elements having functions identical to those described in Embodiments 1 through 3, and such constituent elements will not be described repeatedly.

Figure 12:
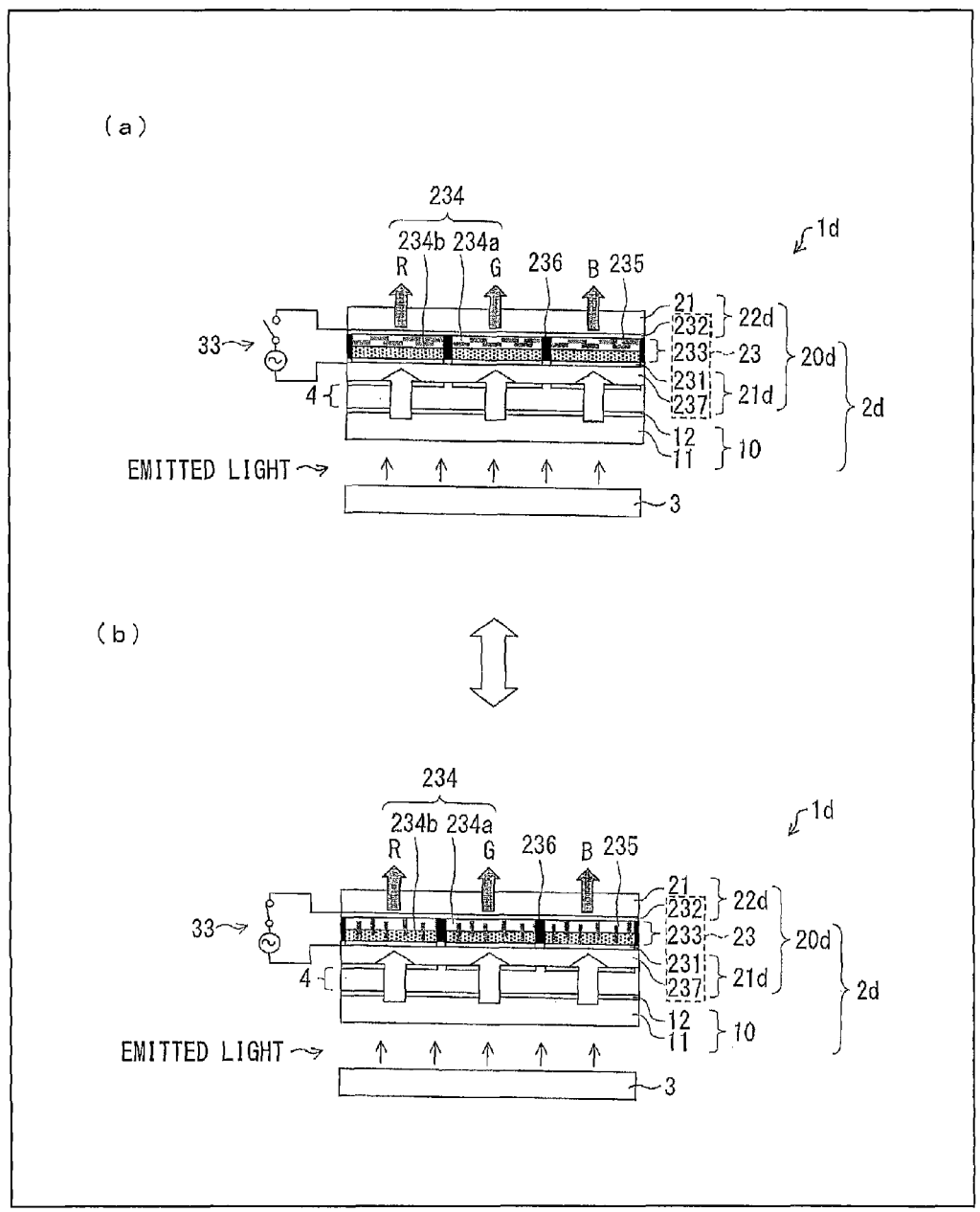
FIG. 12 is a cross-sectional view schematically illustrating, in (a) and (b), a configuration of a display device in accordance with Embodiment 4.

Each of (a) and (b) of FIG. 12 is a cross-sectional view schematically illustrating a configuration of a display device 1d in accordance with Embodiment 4. The display device 1d (i) includes a display panel 2d, a backlight 3 for emitting light to the display panel 2d, and a driving circuit (not illustrated) and (ii) carries out color display.

The display panel 2d includes (i) substrates 10 and 20d which are arranged to face each other and (ii) an optical modulation layer 4 for information display which optical modulation layer 4 is provided between the substrates 10 and 20d. The substrate 10 is provided on the rear surface side of the display panel 2d, and the substrate 20d is provided on the display surface side (i.e., viewer side). The display panel 2d has a plurality of pixels which are arranged in a matrix manner.

The substrate 20d includes a glass substrate 21 and a color filter 23. The color filter 23 includes (i) electrodes 231 (first electrode) corresponding to the respective pixels, (ii) an electrode 232 (common electrode, second electrode) which faces the electrodes 231, (iii) an optical modulation layer 233 provided between the electrode 232 and the electrodes 231, and (iv) a glass substrate 237 which faces the glass substrate 21. Note that the electrodes 231 can be configured as a solid (allover) electrode common to all the pixels. The optical modulation layer 233 includes a medium 234, a plurality of shape-anisotropic members 235 contained in the medium 234, and ribs 236 for partitioning the optical modulation layer 233 into areas for the respective pixels. Here, a sub-substrate 21d which corresponds to the first substrate of the present invention is made up of the glass substrate 237 and the electrodes 231. Moreover, a sub-substrate 22d which corresponds to the second substrate of the present invention is made up of the glass substrate 21 and the electrode 232.

At least a side of the sub-substrate 21d (first substrate) which side makes contact with the optical modulation layer 233 is subjected to hydrophobic treatment. At least a side of the sub-substrate 22d (second substrate) which side makes contact with the optical modulation layer 233 is subjected to hydrophilic treatment.

The shape-anisotropic members 235 can be flakes each of which is made of transparent resin containing a dye or a pigment so as to be in, for example, any of red (R), green (G), and blue (B). The flakes are partitioned by the stripe-shaped ribs 236 for each color. Moreover, the shape-anisotropic members 235 are subjected to hydrophilic treatment on their surfaces. Note that the shape-anisotropic members 235 can be subjected to hydrophobic treatment, as with the embodiments above described.

The medium 234 contains (i) a polar solvent 234a which makes contact with the hydrophilic glass substrate 21 and (ii) a nonpolar solvent 234b which makes contact with the hydrophobic glass substrate 237.

As a manufacturing method, for example, a process can be employed in which a mixture of the flakes and the medium is applied by an ink-jet method so as to be separated for each color. Note that the colored areas are partitioned by the ribs 236 so as to correspond to the respective pixels. The optical modulation layer 4 for information display can be configured as with the optical modulation layers described in Embodiments 1 through 3 or can be a general liquid crystal layer.

In a case where color display is carried out with the above described configuration, the flakes are controlled to be in the transverse orientation (by not applying a voltage) so that light which has entered the color filter 23 passes through the flakes having the colors. On the other hand, in a case where black and white display is carried out, the flakes are controlled to be in the longitudinal orientation (by applying a voltage) so that light which has entered the color filter 23 directly reaches the viewer. According to the configuration, for example, in a case where transmissive display is carried out, it is possible to carry out color display, and to display a black and white content such as an electric book while inhibiting loss of light due to the color filter, and this allows a reduction in power consumption by the backlight. Alternatively, in a case where reflective display is carried out, it is possible to carry out color display and, in a dark environment with low viewability, it is possible to carry out black and white display with emphasis on lightness.

As such, according to the configuration, it is possible to provide the display device that can switch between color display and black and white display.

Note that the color filter 23 is not limited to the above described configuration, and can further include at least any of a red-colored shape-anisotropic member, a green-colored shape-anisotropic member, a blue-colored shape-anisotropic member, a cyan (C)-colored shape-anisotropic member, a magenta (M)-colored shape-anisotropic member, and a yellow (Y)-colored shape-anisotropic member. Besides this, the color filter 23 can have an area that does not contain a shape-anisotropic member. That is, by taking into consideration a color reproduction range of a displayed image, it is preferable that the plurality of shape-anisotropic members are made of transparent resin and include at least a red (R)-colored shape-anisotropic member, a green (G)-colored shape-anisotropic member, and a blue (B)-colored shape-anisotropic member.

The display device in each of the embodiments is not limited to the above described configuration and can have the following configuration.

(Regarding Cell Thickness)

Figure 13:
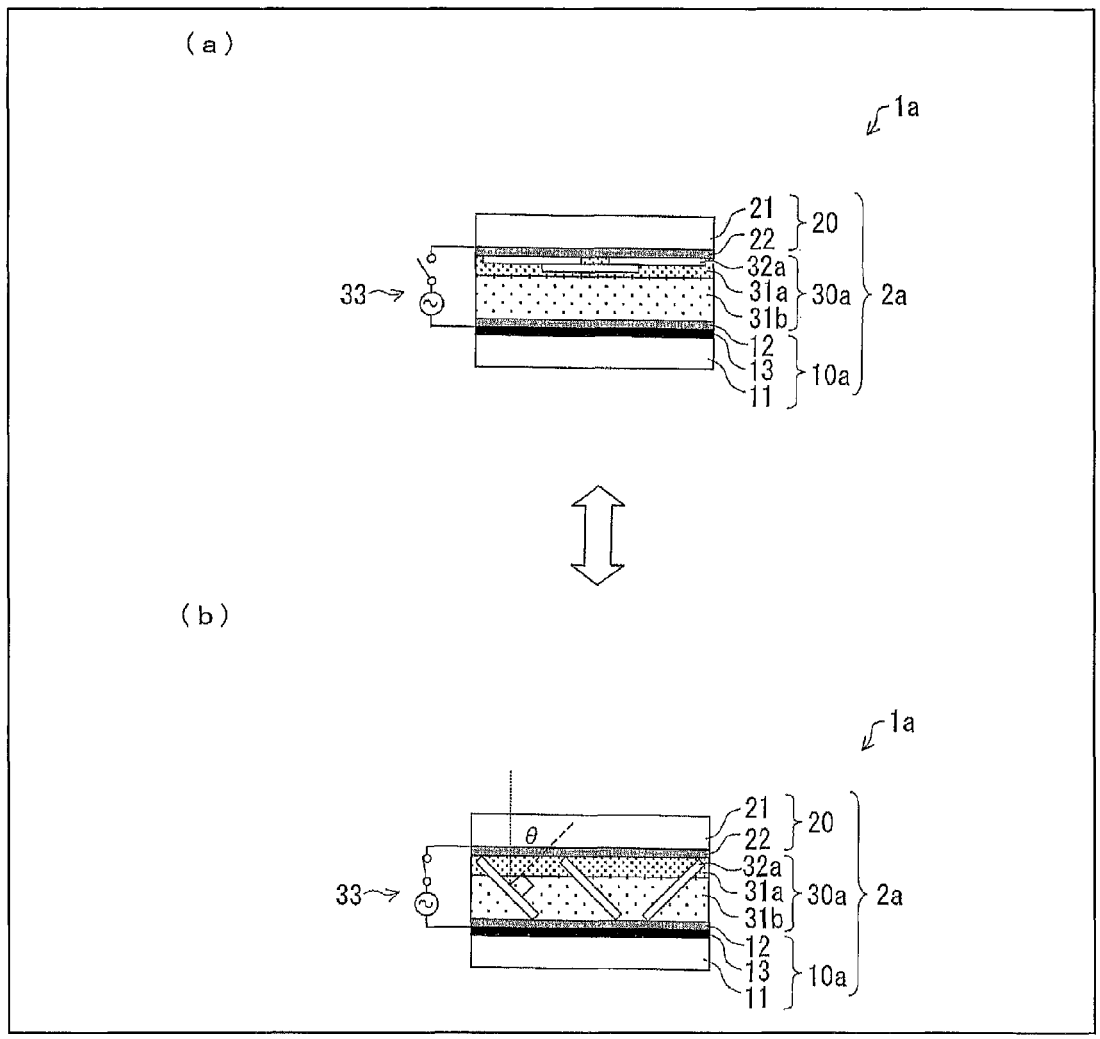
FIG. 13 is a cross-sectional view schematically illustrating, in (a) and (b), a configuration in which a cell thickness is reduced in the display device of Embodiment 2.

It is preferable that the thickness (i.e., cell thickness) of the optical modulation layer is a thickness sufficient for the flakes to be aligned in the longitudinal orientation as illustrated in, for example, (b) of FIG. 1. Note, however, that the thickness of the optical modulation layer is not limited to this, and can be a thickness with which the flakes remain at an intermediate angle (i.e., oblique orientation). That is, the cell thickness can be set to be (i) smaller than a major axis length of the flake and (ii) a thickness with which, when the flakes are obliquely oriented with respect to the substrate at a maximum angle, light reflected by the flakes is not directly emitted to the display surface side. Specifically, for example, in a case where the optical modulation layer 30a contains a medium (i.e., polar solvent 31a and nonpolar solvent 31b) that has a refractive index of 1.5 in the reflection type display device 1a of Embodiment 2 which includes the black light absorbing layer 13 provided on the rear surface side of the display panel 2a, the cell thickness is set such that an angle θ formed by a normal direction with respect to the display panel surface and a normal direction with respect to the flake surface is 42 degrees or more as illustrated in (b) of FIG. 13. This prevents light, which has been reflected by the flakes, from at least being directly emitted via the substrate on the viewer side, and it is therefore possible to appropriately carry out black display.

(Regarding Shape 1 of Shape-Anisotropic Member)

The shape-anisotropic members (e.g., flakes) are not limited to the configuration in which the shape-anisotropic members are freely rotated in the medium of the optical modulation layer, and can be partially fixed to the substrate 10 or the substrate 20. (a) and (b) of FIG. 14 illustrate a configuration in which an end part of each flake is fixed to the substrate 10.

Figure 15:
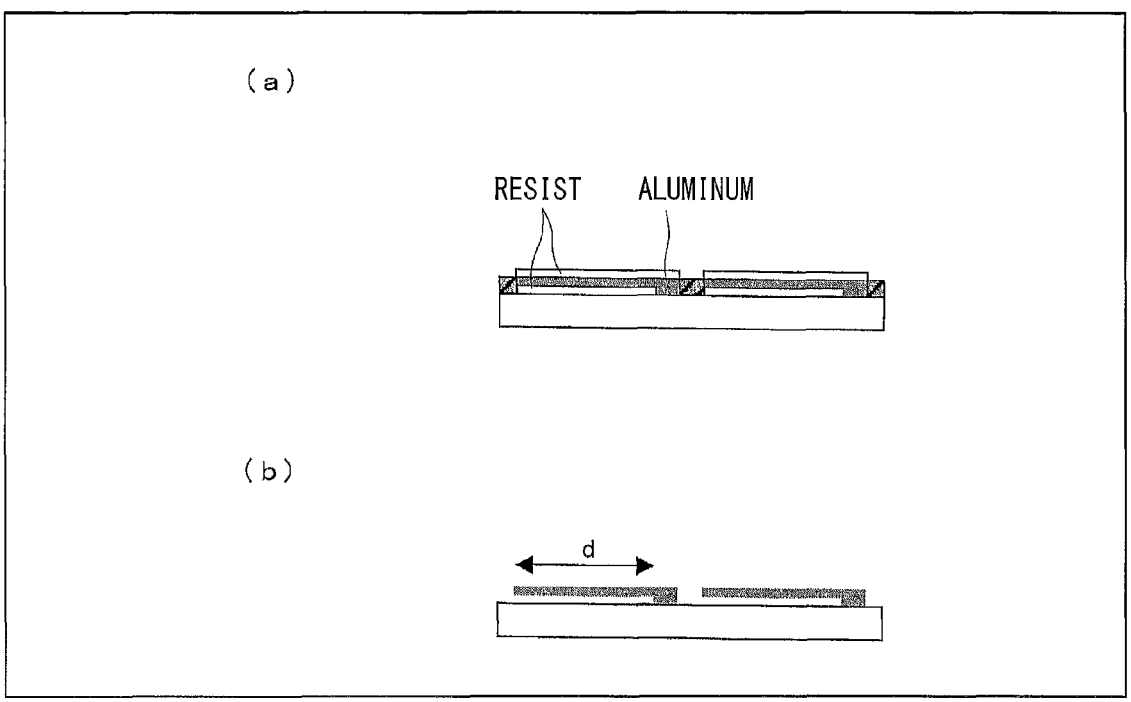
FIG. 15 is view for explaining, in (a) and (b), a method for manufacturing a display panel in which each of flakes is partially fixed to a substrate.

The following description will discuss an example method for manufacturing a display panel in which a part of each flake is fixed to a substrate, with reference to FIG. 15.

First, first resist layers are formed on the substrate 10 by patterning with general photolithography in accordance with a size of a flake. Then, for example, an aluminum layer is formed with vapor deposition or the like, and second resist layers are formed by patterning each of which is larger than the first resist layer by an area in which the aluminum is fixed to the substrate as illustrated in (a) of FIG. 15. Next, the composite layer is etched with, for example, an etchant containing phosphoric acid, nitric acid, and acetic acid so that the aluminum shaded by oblique lines in (a) of FIG. 15 is removed. Further, by removing the resist with, for example, NMP (N-methylpyrrolidone), it is possible to obtain shaped aluminum articles each of which is partially fixed to the substrate. Then, the substrate 10 and the substrate 20 facing the substrate 10 are adhered to each other via a medium while securing a distance between the substrates by spacers or the like each of which has a height corresponding to the length "d" illustrated in (b) of FIG. 15. As such, the display panel 2 (see (a) of FIG. 14) can be manufactured in which each of the flakes is partially fixed to the substrate.

Figure 14:
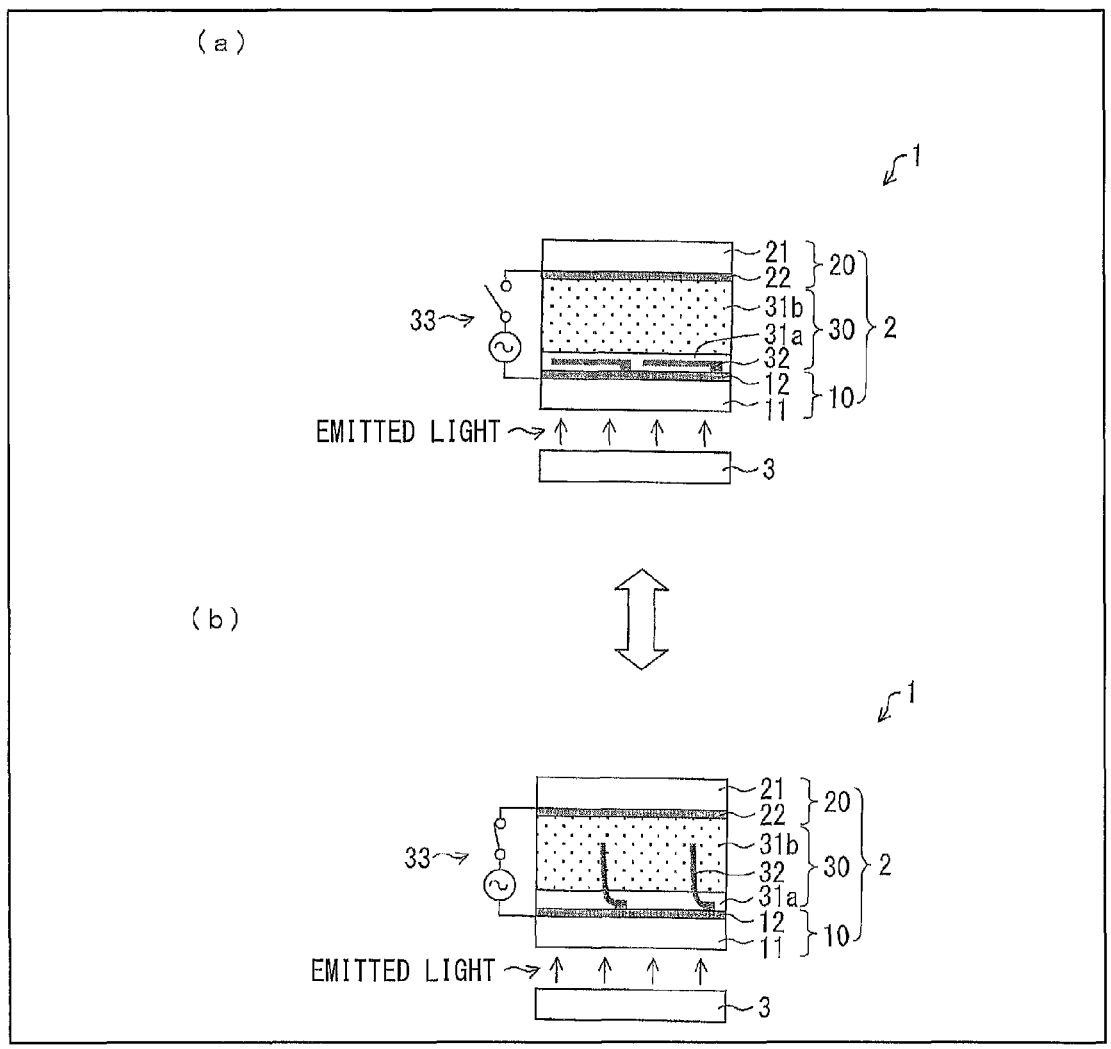
FIG. 14 is a cross-sectional view schematically illustrating, in (a) and (b), a configuration in which end parts of flakes are fixed to a substrate in the display device of Embodiment 1.

When an AC voltage or a DC voltage is applied to the optical modulation layer 30 in the display panel 2, the flakes are transformed as illustrated in (b) of FIG. 14, and therefore light can pass through. On the other hand, while no voltage is applied, the flakes returns to their original shapes as illustrated in (a) of FIG. 14, and therefore light is blocked.

Note that another configuration can be employed in which, for example, one end of the shape-anisotropic member (e.g., flake) is fixed with a string, a wire, or the like and the flake makes axial rotation around a fixed end.

(Regarding Shape 2 of Shape-Anisotropic Member)

Figure 16:
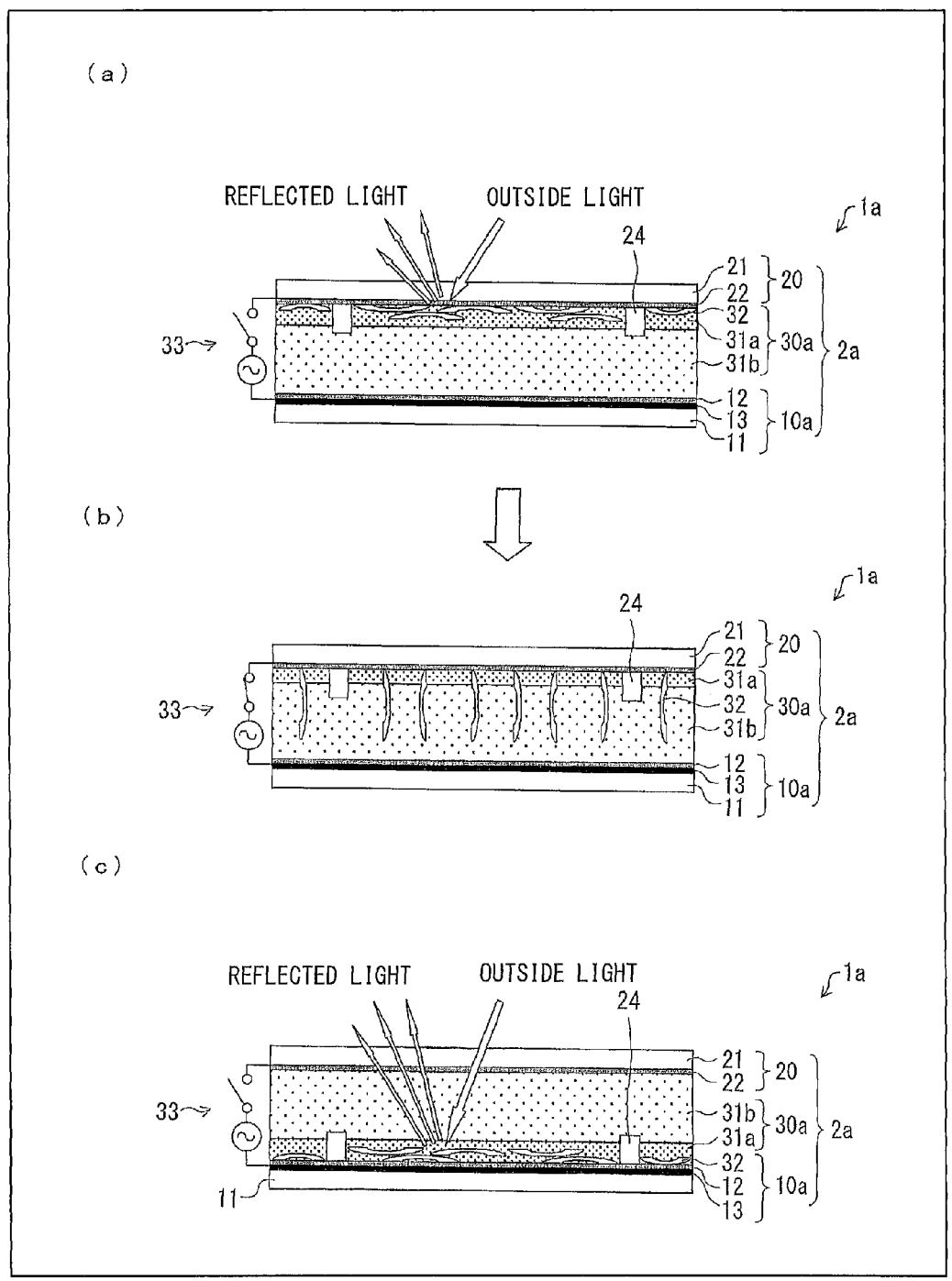
FIG. 16 is a cross-sectional view schematically illustrating, in (a) through (c), a configuration in which each of flakes is bowl-shaped in the display device of Embodiment 2.

The shape-anisotropic member can be a bowl-shaped (i.e., convexo-concave) flake. (a) and (b) of FIG. 16 illustrate a state in which bowl-shaped flakes are employed in the reflection type display device 1a of Embodiment 2.

According to the configuration, it is possible to improve a light-scattering property, as compared with the flat (flat surface) flakes (see FIG. 1). Note that, according to the display device 1a illustrated in (c) of FIG. 16, the glass substrate 11 has been subjected to hydrophilic treatment, the glass substrate 21 has been subjected to hydrophobic treatment, the polar solvent 31a makes contact with the substrate 10a, and the nonpolar solvent 31b makes contact with the substrate 20. Moreover, the flakes (i.e., the shape-anisotropic members 32) have been subjected to hydrophilic treatment. With the configuration, the flakes are stabilized, while no voltage is applied, in such a manner as to stick to the substrate 10a so as to be aligned in the transverse orientation.

(Regarding Shape 3 of Shape-Anisotropic Member)

Figure 17:
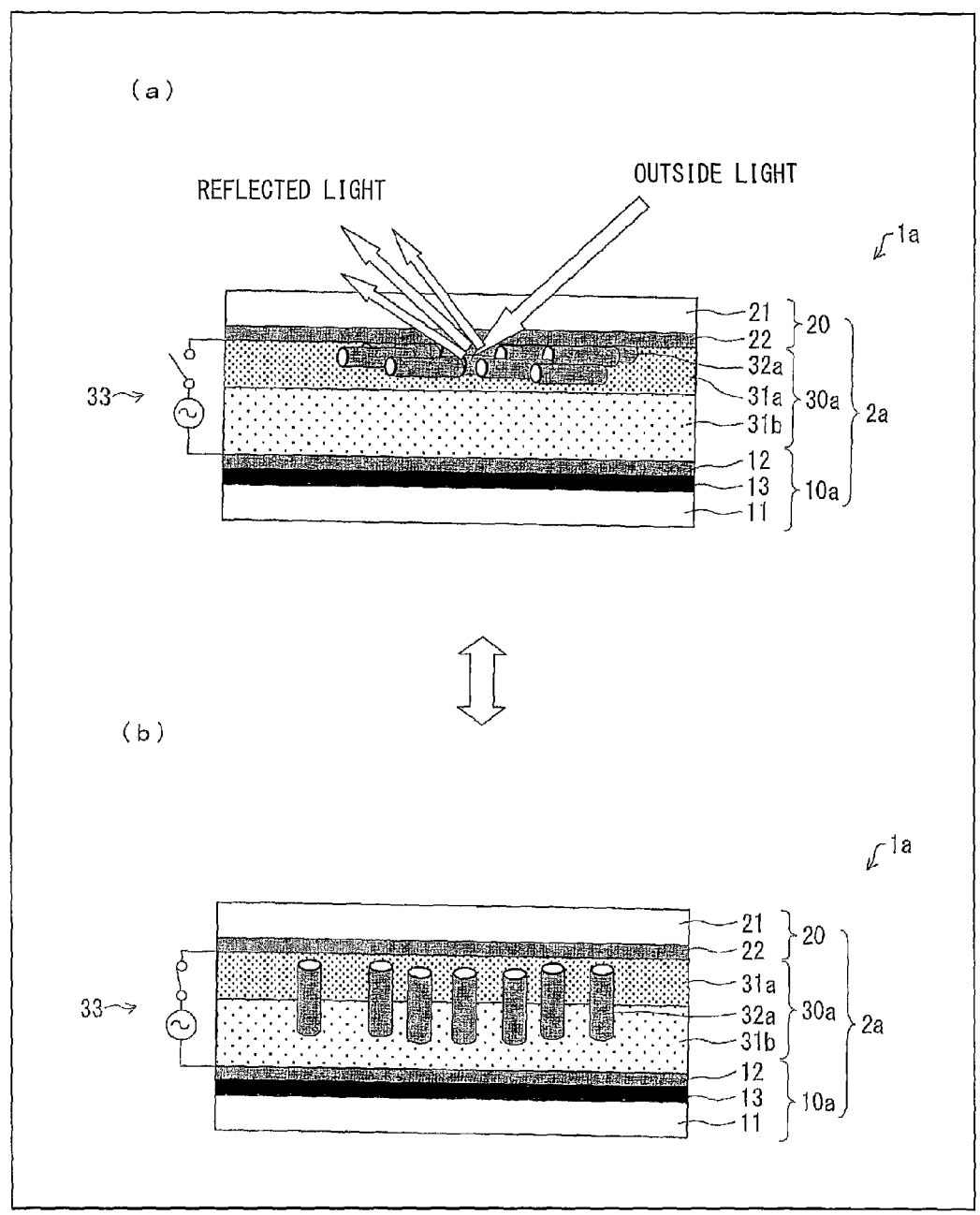
FIG. 17 is a cross-sectional view schematically illustrating, in (a) and (b), a configuration in which each of flakes is fiber-shaped in the display device of Embodiment 2.
Figure 18:
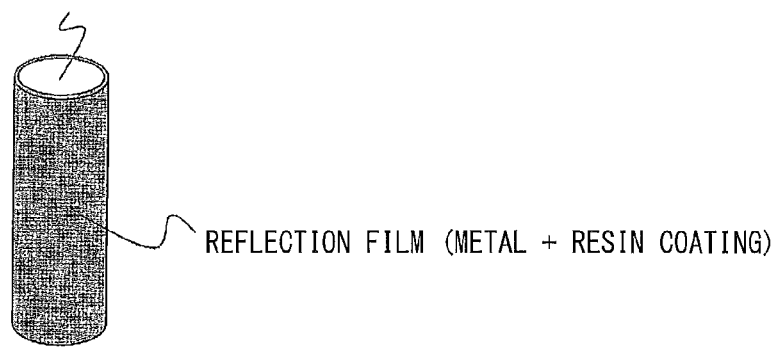
FIG. 18 is a perspective view schematically illustrating a configuration of a shape-anisotropic member in which a reflection film is formed on a transparent columnar glass.

The shape-anisotropic member can have a fiber shape. (a) and (b) of FIG. 17 illustrate a state in which fiber-shaped shape-anisotropic members are employed in the reflection type display device 1a of Embodiment 2. The fiber-shaped shape-anisotropic member (hereinafter, referred to as "fiber") can be configured, for example, by forming a reflection film (i.e., metal or coating of metal and resin) on a transparent columnar glass as illustrated in FIG. 18. (a) of FIG. 17 illustrates a state in which no voltage is applied and therefore the fibers are aligned in the transverse orientation so that reflection display (i.e., white display) is carried out. In the transverse orientation, outside light is reflected to scatter by the reflection films of the fibers, and white display is thus carried out. (b) of FIG. 17 illustrates a state in which an AC voltage or a DC voltage is applied and therefore the fibers are aligned in the longitudinal orientation so that transmissive display (i.e., black display) is carried out. In the longitudinal orientation, outside light is reflected by the fibers and then travels toward the substrate 10a and is absorbed by the light absorbing layer 13. The black display is thus carried out.

(Regarding Method for Applying Voltage)

According to the display device of the present invention, it is considered that halftone display can be carried out by adjusting a magnitude of voltage to be applied to the optical modulation layer, a size of flakes, and the like. For example, by employing a mixture of flakes having different sizes, it is possible to vary rotation angles of flakes in accordance with the sizes of the flakes. Alternatively, it is possible to vary rotation angles of flakes simply in accordance with a magnitude of voltage to be applied, and therefore the flakes can have substantially identical sizes. Under the circumstances, it is considered that optical transmittance can be controlled (i.e., halftone display can be carried out) in accordance with a magnitude of an applied voltage.

(Regarding Diffuse Reflecting Layer)

Figure 19:
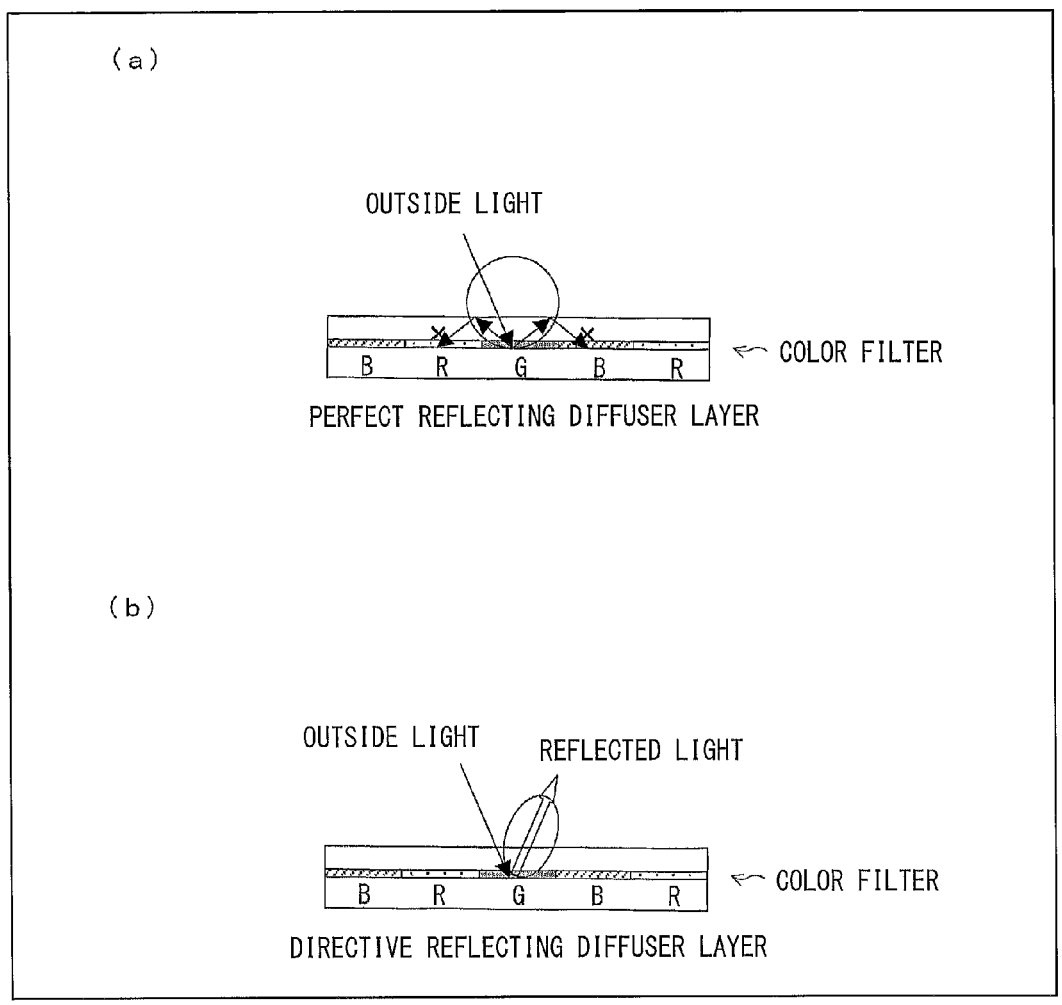
FIG. 19 is a view in which (a) illustrates a light reflection property of a conventional color filter and (b) illustrates a light reflection property of a color filter of the present invention.
Figure 20:
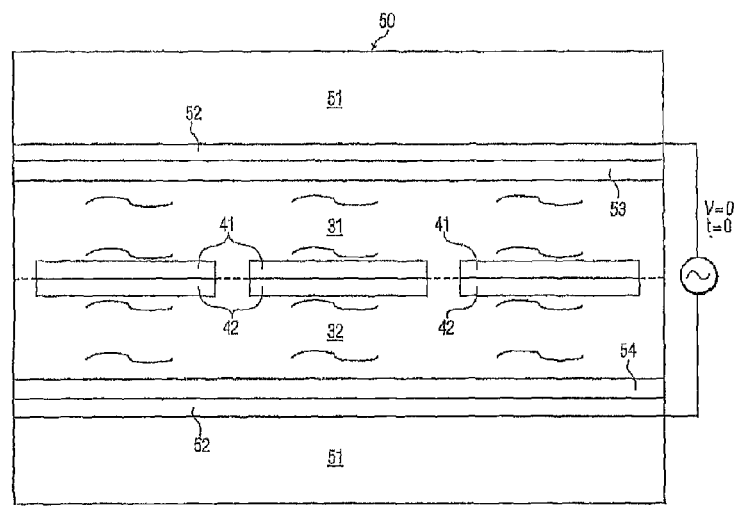
FIG. 20 is a cross-sectional view schematically illustrating, in (a) and (b), a configuration of a conventional transflective display.
Figure 20:
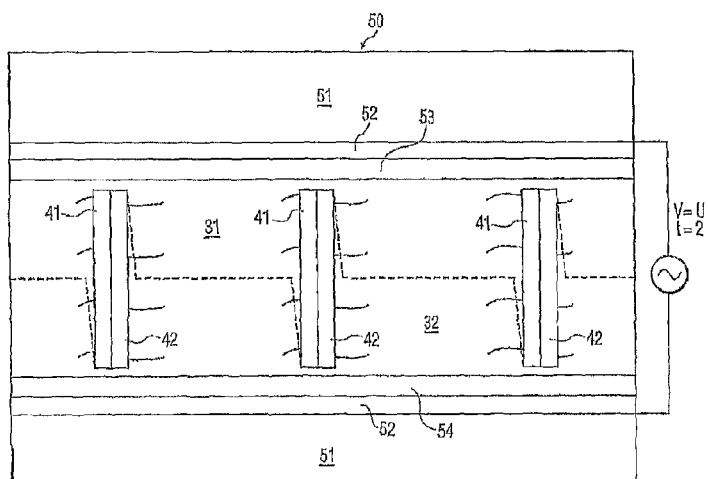

According to the reflection type display device 1a of Embodiment 2, it is possible to control a scattering property of reflected light by selecting a size, a shape, and a planarity of flake and adjusting a concentration of flakes. For example, in a case of a fine particle electrophoresis display which displays white by scattering with the use of titanium oxide or the like, the scattering is substantially isotropic. In a case where color display is carried out by the display having such a scattering property with the use of a color filter, light, which has been scattered and guided in a certain color pixel, is absorbed by a color filter of another color pixel, and this causes a great loss of reflected light (see (a) of FIG. 19). On the other hand, according to the display device 1a of the present invention, it is possible to achieve a certain degree of directivity in scattering (see (b) of FIG. 19), and it is therefore possible to carry out high quality color display with the use of a color filter.

The present invention is not limited to the embodiments, but can be altered by a skilled person in the art within the scope of the claims. An embodiment derived from a proper combination of technical means disclosed in respective different embodiments is also encompassed in the technical scope of the present invention.

INDUSTRIAL APPLICABILITY

The present invention is suitable for a display such as a television.

REFERENCE SIGNS LIST 1, 1a, 1b, 1c, 1d: Display device
2, 2a, 2b, 2c, 2d: Display panel
3: Backlight
4: Optical modulation layer for information display
10, 10a: Substrate (first substrate)
11: Glass substrate
12: Electrode (first electrode, pixel electrode)
13: Light absorbing layer
20: Substrate (second substrate)
21: Glass substrate
22: Electrode (second electrode, common electrode)
24: Rib
30, 30a, 30b, 30c, 30d: Optical modulation layer
31a: Polar solvent
31b: Nonpolar solvent
32, 32a: Shape-anisotropic member
33: Power source
20d: Substrate
21d: Sub-substrate (first substrate)
22d: Sub-substrate (second substrate)
23: Color filter

The invention claimed is:

1. A display panel comprising:
a first substrate and a second substrate which face each other, the first substrate being provided on a rear surface side and the second substrate being provided on a display surface side; and
an optical modulation layer that controls a transmittance of incoming light, the optical modulation layer being provided between the first substrate and the second substrate and containing a plurality of shape-anisotropic members, wherein the optical modulation layer includes a polar solvent and a nonpolar solvent, the plurality of shape-anisotropic members have a hydrophilic property or a hydrophobic property, one of the first substrate and the second substrate has a hydrophilic property and makes contact with the polar solvent, another one of the first substrate and the second substrate has a hydrophobic property and makes contact with the nonpolar solvent, a projected area of the plurality of shape-anisotropic members onto the first substrate and the second substrate is changed by adjusting a magnitude of a voltage applied to the optical modulation layer, in a case where the plurality of shape-anisotropic members have the hydrophilic property, a layer thickness of the polar solvent is smaller than a layer thickness of the nonpolar solvent; and in a case where the plurality of shape-anisotropic members have the hydrophobic property, the layer thickness of the nonpolar solvent is smaller than the layer thickness of the polar solvent.

2. The display panel as set forth in claim 1, wherein:

in a case where the plurality of shape-anisotropic members have the hydrophilic property and are oriented so that major axes of the respective plurality of shape-anisotropic members are aligned in parallel with the first substrate and the second substrate, the plurality of shape-anisotropic members are contained in the polar solvent; and in a case where the plurality of shape-anisotropic members have the hydrophobic property and are oriented so that the major axes of the respective plurality of shape-anisotropic members are aligned in parallel with the first substrate and the second substrate, the plurality of shape-anisotropic members are contained in the nonpolar solvent.

3. The display panel as set forth in claim 1, wherein:

the optical modulation layer allows light to pass through while a voltage is applied to the optical modulation layer, and the optical modulation layer blocks light while a voltage applied to the optical modulation layer is zero.

4. The display panel as set forth in claim 1, wherein:

while the voltage is applied to the optical modulation layer, the plurality of shape-anisotropic members are oriented so that the major axes are aligned perpendicular to the first substrate and the second substrate, and while the voltage applied to the optical modulation layer is zero, the plurality of shape-anisotropic members are oriented so that the major axes are aligned in parallel with the first substrate and the second substrate.

5. The display panel as set forth in claim 1, wherein the plurality of shape-anisotropic members have chargeability.

6. The display panel as set forth in claim 1, wherein the projected area is changed by rotating the plurality of shape-anisotropic members in accordance with the magnitude of the voltage to be applied to the optical modulation layer.

7. The display panel as set forth in claim 1, wherein the projected area is changed by changing shapes of the respective plurality of shape-anisotropic members in accordance with the magnitude of the voltage to be applied to the optical modulation layer.

8. The display panel as set forth in claim 1, wherein:

the optical modulation layer serves as a color filter; and the plurality of shape-anisotropic members are made of a transparent resin and include at least a red-colored shape-anisotropic member, a green-colored shape-anisotropic member, and a blue-colored shape-anisotropic member.

9. A display panel comprising:

a first substrate and a second substrate which face each other, the first substrate being provided on a rear surface side and the second substrate being provided on a display surface side; and an optical modulation layer that controls a transmittance of incoming light, the optical modulation layer being provided between the first substrate and the second substrate and containing a plurality of shape-anisotropic members, wherein the optical modulation layer includes a polar solvent and a nonpolar solvent, the plurality of shape-anisotropic members have a hydrophilic property or a hydrophobic property, one of the first substrate and the second substrate has a hydrophilic property and makes contact with the polar solvent, another one of the first substrate and the second substrate has a hydrophobic property and makes contact with the nonpolar solvent, a projected area of the plurality of shape-anisotropic members onto the first substrate and the second substrate is changed by adjusting a magnitude of a voltage applied to the optical modulation layer, in a case where the plurality of shape-anisotropic members have the hydrophilic property, a layer thickness of the polar solvent is (i) smaller than a layer thickness of the nonpolar solvent and (ii) smaller than a major axis length of each of the plurality of shape-anisotropic members, and in a case where the plurality of shape-anisotropic members have the hydrophobic property, the layer thickness of the nonpolar solvent is (i) smaller than the layer thickness of the polar solvent and (ii) smaller than the major axis length of each of the plurality of shape-anisotropic members.

10. The display panel as set forth in claim 9, wherein in a case where the plurality of shape-anisotropic members have the hydrophilic property and are oriented so that major axes of the respective plurality of shape-anisotropic members are aligned in parallel with the first substrate and the second substrate, the plurality of shape-anisotropic members are contained in the polar solvent; and in a case where the plurality of shape-anisotropic members have the hydrophobic property and are oriented so that the major axes of the respective plurality of shape-anisotropic members are aligned in parallel with the first substrate and the second substrate, the plurality of shape-anisotropic members are contained in the nonpolar solvent.

11. The display panel as set forth in claim 9, wherein the optical modulation layer allows light to pass through while a voltage is applied to the optical modulation layer, and the optical modulation layer blocks light while a voltage applied to the optical modulation layer is zero.

12. The display panel as set forth in claim 9, wherein while the voltage is applied to the optical modulation layer, the plurality of shape-anisotropic members are oriented so that the major axes are aligned perpendicular to the first substrate and the second substrate, and while the voltage applied to the optical modulation layer is zero, the plurality of shape-anisotropic members are oriented so that the major axes are aligned in parallel with the first substrate and the second substrate.

13. The display panel as set forth in claim 9, wherein the plurality of shape-anisotropic members have chargeability.

14. The display panel as set forth in claim 9, wherein the projected area is changed by rotating the plurality of shape-anisotropic members in accordance with the magnitude of the voltage to be applied to the optical modulation layer.

15. The display panel as set forth in claim 9, wherein the projected area is changed by changing shapes of the respective plurality of shape-anisotropic members in accordance with the magnitude of the voltage to be applied to the optical modulation layer.

16. The display panel as set forth in claim 9, wherein:
the optical modulation layer serves as a color filter, and
the plurality of shape-anisotropic members are made of a transparent resin and include at least a red-colored shape-anisotropic member, a green-colored shape-anisotropic member, and a blue-colored shape-anisotropic member.

17. A display panel comprising:
a first substrate and a second substrate which face each other, the first substrate being provided on a rear surface side and the second substrate being provided on a display surface side; and
an optical modulation layer that controls a transmittance of incoming light, the optical modulation layer being provided between the first substrate and the second substrate and containing a plurality of shape-anisotropic members, wherein
the optical modulation layer includes a polar solvent and a nonpolar solvent,
the plurality of shape-anisotropic members have a hydrophilic property or a hydrophobic property,
one of the first substrate and the second substrate has a hydrophilic property and makes contact with the polar solvent,
another one of the first substrate and the second substrate has a hydrophobic property and makes contact with the nonpolar solvent,
a projected area of the plurality of shape-anisotropic members onto the first substrate and the second substrate is changed by adjusting a magnitude of a voltage applied to the optical modulation layer,
in a case where the plurality of shape-anisotropic members have the hydrophilic property, a rib is defined on a hydrophilic one of the first substrate and the second substrate, and
in a case where the plurality of shape-anisotropic members have the hydrophobic property, the rib is defined on a hydrophobic one of the first substrate and the second substrate.

18. The display panel as set forth in claim 17, wherein the rib has a lattice shape or an island shape.

19. The display panel as set forth in claim 17, wherein the rib has a height which is substantially identical with a thickness of the optical modulation layer.

20. The display panel as set forth in claim 17, wherein a height of the rib is 5 μm or less.

* * * * *